United States Patent
Park et al.

(10) Patent No.: US 11,202,290 B2
(45) Date of Patent: Dec. 14, 2021

(54) METHOD AND APPARATUS FOR TRANSMITTING AND RECEIVING WIRELESS SIGNAL IN WIRELESS COMMUNICATION SYSTEM

(71) Applicant: LG Electronics Inc., Seoul (KR)

(72) Inventors: Changhwan Park, Seoul (KR); Joonkui Ahn, Seoul (KR); Seunggye Hwang, Seoul (KR); Seokmin Shin, Seoul (KR); Sukhyon Yoon, Seoul (KR)

(73) Assignee: LG Electronics Inc., Seoul (KR)

( * ) Notice: Subject to any disclaimer, the term of this patent is extended or adjusted under 35 U.S.C. 154(b) by 66 days.

(21) Appl. No.: 16/625,070

(22) PCT Filed: Jun. 27, 2018

(86) PCT No.: PCT/KR2018/007306
§ 371 (c)(1),
(2) Date: Dec. 20, 2019

(87) PCT Pub. No.: WO2019/004729
PCT Pub. Date: Jan. 3, 2019

(65) Prior Publication Data
US 2020/0178258 A1 Jun. 4, 2020

Related U.S. Application Data

(60) Provisional application No. 62/525,727, filed on Jun. 27, 2017, provisional application No. 62/528,518, (Continued)

(51) Int. Cl.
*H04W 72/04* (2009.01)
*H04L 5/00* (2006.01)

(52) U.S. Cl.
CPC ........ *H04W 72/0466* (2013.01); *H04L 5/001* (2013.01); *H04L 5/0048* (2013.01);
(Continued)

(58) Field of Classification Search
CPC ........ H04L 5/00; H04L 27/26; H04L 5/0053; H04L 1/08; H04L 27/2626; H04L 5/001;
(Continued)

(56) References Cited

U.S. PATENT DOCUMENTS 8,855,076 B2 * 10/2014 Han .................. H04L 27/2697
370/329
8,867,496 B2 * 10/2014 Han .................. H04L 27/2697
370/335

(Continued)

FOREIGN PATENT DOCUMENTS

WO 2017079539 A1 5/2017

OTHER PUBLICATIONS

Ericsson, "NB-IoT—Remaining issues for NPDCCH", 3GPP TSG-RAN1#84-BIS, Apr. 11-15, 2016, R1-162773.
(Continued)

*Primary Examiner* — Man U Phan
(74) *Attorney, Agent, or Firm* — Dentons US LLP

(57) ABSTRACT

The present invention relates to a wireless communication system and, more particularly, to a method comprising the steps of: generating a first complex symbol sequence corresponding to one time unit including a plurality of transmission symbols; generating a second complex symbol sequence by applying primary scrambling to the first complex symbol sequence on a modulation symbol basis; and repeatedly transmitting the second complex symbol sequence through a plurality of time units, wherein secondary scrambling is applied to the signals in each time unit on a transmission symbol basis, the transmission symbol
(Continued)

including an OFDMA symbol or an SC-FDMA symbol; and an apparatus therefor.

12 Claims, 17 Drawing Sheets

Related U.S. Application Data filed on Jul. 4, 2017, provisional application No. 62/547,772, filed on Aug. 19, 2017, provisional application No. 62/548,919, filed on Aug. 22, 2017.

(52) U.S. Cl.
CPC .......... *H04L 5/0053* (2013.01); *H04W 72/042* (2013.01); *H04W 72/0413* (2013.01)

(58) Field of Classification Search
CPC ................. H04L 27/265; H04L 5/0048; H04L 25/03866; H04J 11/005; H04W 72/0413; H04W 72/0466; H04W 72/042; H04W 72/04
USPC ......................................................... 370/329
See application file for complete search history.

(56) References Cited

U.S. PATENT DOCUMENTS

| | | | | |
|---|---|---|---|---|
| 8,885,628 | B2* | 11/2014 | Palanki | H04J 11/00 370/342 |
| 9,084,238 | B2* | 7/2015 | Gao | H04L 5/0055 |
| 9,106,385 | B2* | 8/2015 | Han | H04L 5/0055 |
| 9,723,594 | B2* | 8/2017 | Han | H04L 5/0053 |
| 9,948,442 | B2* | 4/2018 | Han | H04L 27/2636 |
| 10,721,045 | B2* | 7/2020 | Han | H04L 5/0055 |
| 10,764,845 | B2* | 9/2020 | Reial | H04J 13/0062 |
| 2008/0310547 | A1* | 12/2008 | Tiirola | H04L 27/2615 375/296 |
| 2010/0041350 | A1* | 2/2010 | Zhang | H04L 5/0023 455/101 |
| 2013/0064216 | A1 | 3/2013 | Gao et al. | |
| 2014/0301238 | A1 | 10/2014 | Chun et al. | |
| 2018/0316464 | A1* | 11/2018 | Stern-Berkowitz | H04L 1/1657 |
| 2020/0204305 | A1* | 6/2020 | Stern-Berkowitz | H04L 1/1657 |

OTHER PUBLICATIONS

Qualcomm Incorporated, "Discussion on performance issues for PBCH and SIB1 in interference-limited scenarios", 3GPP TSG RAN WG1 Meeting #88, Feb. 13-17, 2017, R1-1702514.

Huawei, HiSilicon, "Motivation for change to scrambling of NB-IoT MIB/SIB transmission", 3GPP TSG RAN WG1 Meeting #88, Feb. 13-17, 2017, R1-1703087.

Qualcomm Incorporated, "Interference randomization for Rel-14 NB-IoT", 3GPP TSG RAN WG1 Meeting #89, May 15-19, 2017, R1-1708756.

Huawei, HiSilicon, "On scrambling for interference randomization in Rel-14 NB-IoT", 3GPP TSG RAN WG1 Meeting #90, Aug. 21-25, 2017, R1-1713368.

R1-1701877: 3GPP TSG-RAN1 Meeting #88, Athens, Greece, Feb. 13-17, 2017, Ericsson, "Introduction of NB-IoT enhancements," pp. 1-22.

R1-168215: 3GPP TSG-RAN Meeting #86, Gothenburg, Sweden, Aug. 22-26, 2016, Ericsson, "Introduction of eLAA," pp. 1-127.

* cited by examiner

METHOD AND APPARATUS FOR TRANSMITTING AND RECEIVING WIRELESS SIGNAL IN WIRELESS COMMUNICATION SYSTEM

This application is the National Stage filing under 35 U.S.C. 371 of International Application No. PCT/KR2018/007306 filed Jun. 27, 2018, which claims the benefit of U.S. Provisional Application Nos. 62/525,727 filed Jun. 27, 2017; 62/528,518 filed Jul. 4, 2017; 62/547,772 filed Aug. 19, 2017 and 62/548,919 filed Aug. 22, 2017, the contents of which are all hereby incorporated by reference herein in their entirety.

TECHNICAL FIELD

The present disclosure relates to a wireless communication system and, more particularly, to a method and apparatus for transmitting and receiving a radio signal. The wireless communication system includes a narrowband Internet of Things (NB-IoT)-based wireless communication system.

BACKGROUND ART

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may include one of CDMA (code division multiple access) system, FDMA (frequency division multiple access) system, TDMA (time division multiple access) system, OFDMA (orthogonal frequency division multiple access) system, SC-FDMA (single carrier frequency division multiple access) system and the like.

DETAILED DESCRIPTION OF THE DISCLOSURE

Technical Problems

An object of the present disclosure is to provide a method of efficiently performing a radio signal transmission and reception process and an apparatus therefor.

The objects that can be achieved with the present disclosure are not limited to what has been particularly described hereinabove and other objects not described herein will be more clearly understood by persons skilled in the art from the following detailed description.

Technical Solutions

According to an aspect of the present disclosure, provided herein is a method of transmitting a signal by a base station (BS) in a wireless communication system, including generating a first complex symbol sequence related with one time unit including a plurality of transmission symbols; generating a second complex symbol sequence by applying primary scrambling to the first complex symbol sequence in units of modulation symbols; and repeatedly transmitting the second complex symbol sequence through a plurality of time units, secondary scrambling being applied to a signal in each time unit in units of transmission symbols, wherein the transmission symbols include orthogonal frequency division multiplexing (OFDM) symbols or single-carrier frequency division multiple access (SC-FDMA) symbols.

In another aspect of the present disclosure, provided herein is a user equipment (UE) used in a wireless communication system, including a radio frequency (RF) module; and a processor, wherein the processor is configured to generate a first complex symbol sequence related with one time unit including a plurality of transmission symbols, generate a second complex symbol sequence by applying primary scrambling to the first complex symbol sequence in units of modulation symbols, and repeatedly transmit the second complex symbol sequence through a plurality of time units, secondary scrambling being applied to a signal in each time unit in units of transmission symbols, and wherein the transmission symbols include orthogonal frequency division multiplexing (OFDM) symbols or single-carrier frequency division multiple access (SC-FDMA) symbols.

The second complex symbol sequence may be transmitted through a narrowband physical downlink control channel (NPDCCH), a narrowband physical downlink shared channel (NPDSCH), or a narrowband physical uplink shared channel (NPUSCH).

The time unit may include a slot

The secondary scrambling may include adding one value among a plurality of complex values, for example, {1, −1, j, −j}, in units of OFDM symbols to the signal in each time unit in the form of multiplication.

The second complex symbol sequence may be transmitted through 1, 3, 6, or 12 subcarriers in each time unit.

The signal in each time unit may be changed in order in units of the transmission symbols.

The wireless communication system may include a wireless communication system supporting narrowband Internet of Things (NB-IoT)

Advantageous Effects

According to the present disclosure, wireless signal transmission and reception can be efficiently performed in a wireless communication system.

Effects obtainable from the present disclosure may be non-limited by the above mentioned effect. And, other unmentioned effects can be clearly understood from the following description by those having ordinary skill in the technical field to which the present disclosure pertains.

DESCRIPTION OF DRAWINGS

The accompanying drawings, which are included to provide a further understanding of the disclosure and are incorporated in and constitute a part of this specification, illustrate embodiments of the disclosure and together with the description serve to explain the principles of the disclosure.

BEST MODE FOR CARRYING OUT THE DISCLOSURE

Embodiments of the present disclosure are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3rd Generation Partnership Project (3GPP) Long Term Evolution (LTE) is a part of Evolved UMTS (E-UMTS) using E-UTRA, employing OFDMA for downlink and SC-FDMA for uplink. LTE-Advanced (LTE-A) evolves from 3GPP LTE. While the following description is given, centering on 3GPP LTE/LTE-A for clarity, this is purely exemplary and thus should not be construed as limiting the present disclosure.

In a wireless communication system, a user equipment (UE) receives information through downlink (DL) from a base station (BS) and transmit information to the BS through uplink (UL). The information transmitted and received by the BS and the UE includes data and various control information and includes various physical channels according to type/usage of the information transmitted and received by the UE and the BS.

Figure 1:
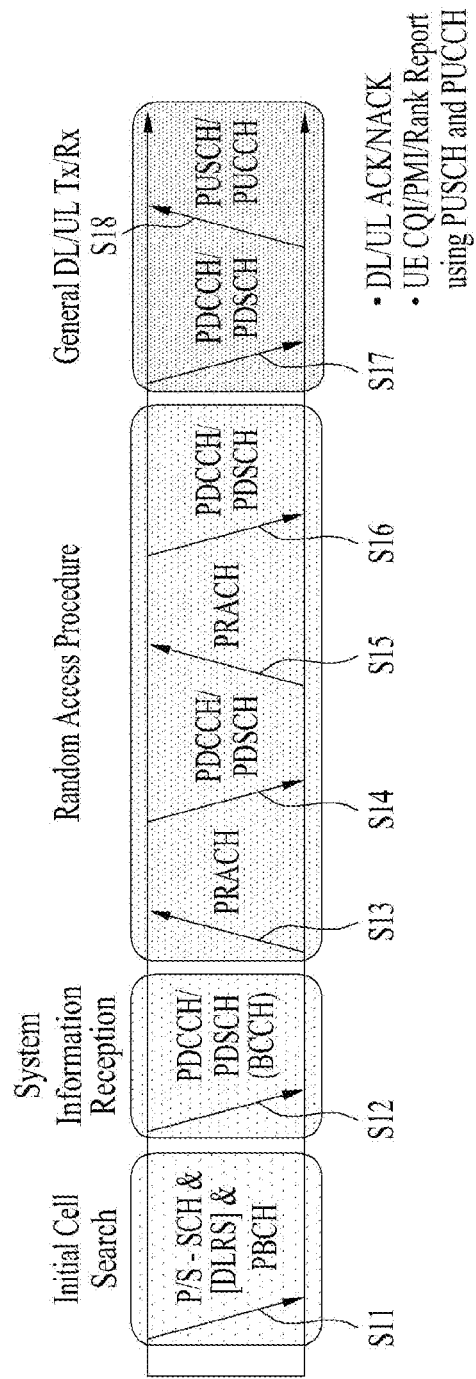
FIG. 1 illustrates physical channels used in 3GPP LTE(-A) and a signal transmission method using the same.

FIG. 1 illustrates physical channels used in 3GPP LTE(-A) and a signal transmission method using the same.

When powered on or when a UE initially enters a cell, the UE performs initial cell search involving synchronization with a BS in step S101. For initial cell search, the UE synchronizes with the BS and acquire information such as a cell Identifier (ID) by receiving a primary synchronization channel (P-SCH) and a secondary synchronization channel (S-SCH) from the BS. Then the UE may receive broadcast information from the cell on a physical broadcast channel (PBCH). In the mean time, the UE may check a downlink channel status by receiving a downlink reference signal (DL RS) during initial cell search.

After initial cell search, the UE may acquire more specific system information by receiving a physical downlink control channel (PDCCH) and receiving a physical downlink shared channel (PDSCH) based on information of the PDCCH in step S102.

The UE may perform a random access procedure to access the BS in steps S103 to S106. For random access, the UE may transmit a preamble to the BS on a physical random access channel (PRACH) (S103) and receive a response message for preamble on a PDCCH and a PDSCH corresponding to the PDCCH (S104). In the case of contention-based random access, the UE may perform a contention resolution procedure by further transmitting the PRACH (S105) and receiving a PDCCH and a PDSCH corresponding to the PDCCH (S106).

After the foregoing procedure, the UE may receive a PDCCH/PDSCH (S107) and transmit a physical uplink shared channel (PUSCH)/physical uplink control channel (PUCCH) (S108), as a general downlink/uplink signal transmission procedure. Control information transmitted from the UE to the BS is referred to as uplink control information (UCI). The UCI includes hybrid automatic repeat and request acknowledgement/negative-acknowledgement (HARQ-ACK/NACK), scheduling request (SR), channel state information (CSI), etc. The CSI includes a channel quality indicator (CQI), a precoding matrix indicator (PMI), a rank indicator (RI), etc. While the UCI is transmitted on a PUCCH in general, the UCI may be transmitted on a PUSCH when control information and traffic data need to be simultaneously transmitted. In addition, the UCI may be aperiodically transmitted through a PUSCH according to request/command of a network.

Figure 2:
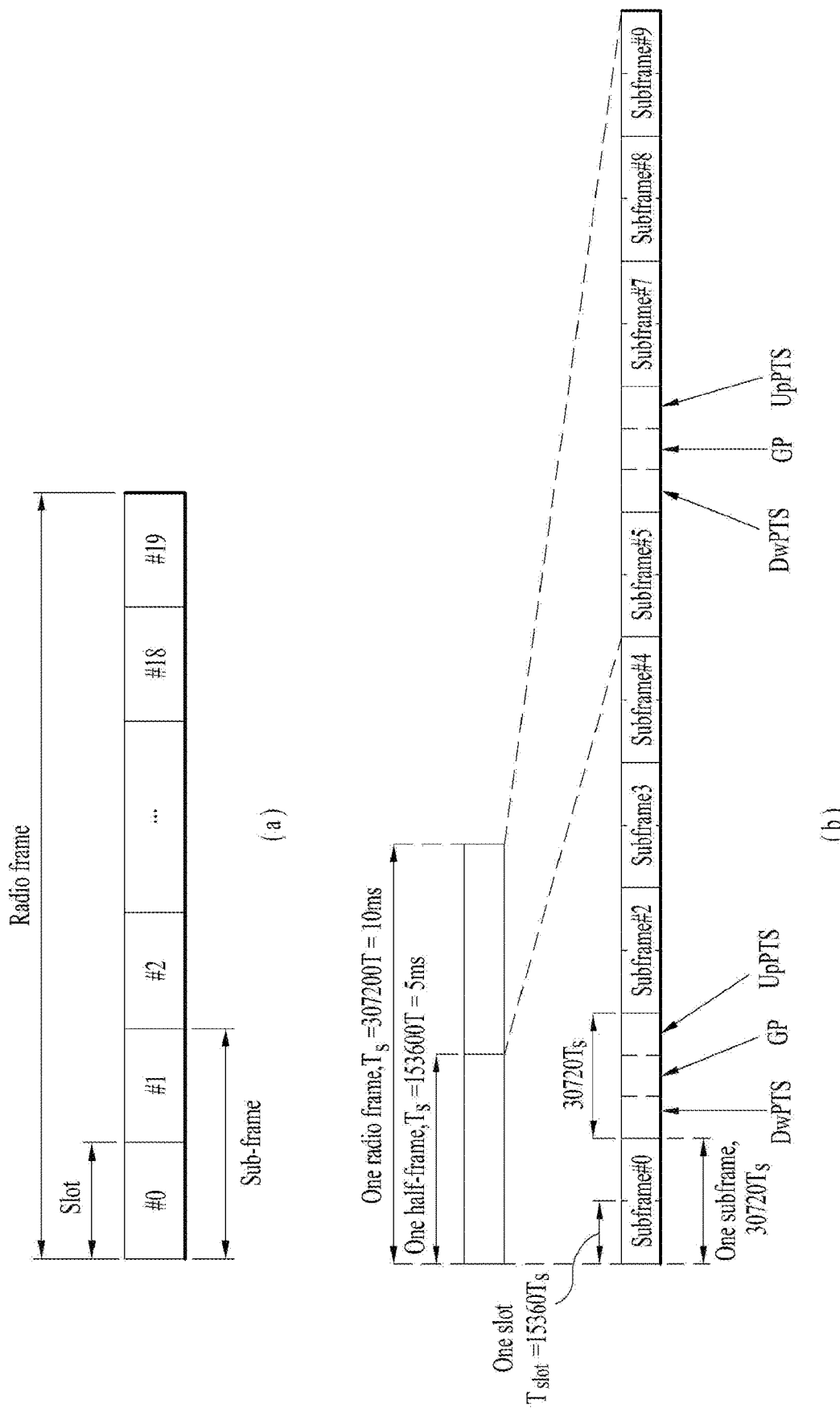
FIG. 2 illustrates a radio frame structure.

FIG. 2 illustrates a radio frame structure. Uplink/downlink data packet transmission is performed on a subframe-by-subframe basis. A subframe is defined as a predetermined time interval including a plurality of symbols. 3GPP LTE supports a type-1 radio frame structure applicable to frequency division duplex (FDD) and a type-2 radio frame structure applicable to time division duplex (TDD).

FIG. 2(*a*) illustrates a type-1 radio frame structure. A downlink subframe includes 10 subframes each of which includes 2 slots in the time domain. A time for transmitting a subframe is defined as a transmission time interval (TTI). For example, each subframe has a duration of 1 ms and each slot has a duration of 0.5 ms. A slot includes a plurality of OFDM symbols in the time domain and includes a plurality of resource blocks (RBs) in the frequency domain. Since downlink uses OFDM in 3GPP LTE, an OFDM symbol represents a symbol period. The OFDM symbol may be called an SC-FDMA symbol or symbol period. An RB as a resource allocation unit may include a plurality of consecutive subcarriers in one slot.

The number of OFDM symbols included in one slot may depend on cyclic prefix (CP) configuration. CPs include an extended CP and a normal CP. When an OFDM symbol is configured with the normal CP, for example, the number of OFDM symbols included in one slot may be 7. When an OFDM symbol is configured with the extended CP, the length of one OFDM symbol increases, and thus the number of OFDM symbols included in one slot is smaller than that in case of the normal CP. In case of the extended CP, the number of OFDM symbols allocated to one slot may be 6. When a channel state is unstable, such as a case in which a UE moves at a high speed, the extended CP can be used to reduce inter-symbol interference.

When the normal CP is used, one subframe includes 14 OFDM symbols since one slot has 7 OFDM symbols. The first three OFDM symbols at most in each subframe can be allocated to a PDCCH and the remaining OFDM symbols can be allocated to a PDSCH.

FIG. 2(b) illustrates a type-2 radio frame structure. The type-2 radio frame includes 2 half frames. Each half frame includes 4(5) normal subframes and 10 special subframes. The normal subframes are used for uplink or downlink according to UL-DL configuration. A subframe is composed of 2 slots.

Table 1 shows subframe configurations in a radio frame according to UL-DL configurations.

TABLE 1

| Uplink-downlink configuration | Downlink-to-Uplink Switch point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes DwPTS (Downlink Pilot TimeSlot), GP (Guard Period), and UpPTS (Uplink Pilot TimeSlot). DwPTS is used for initial cell search, synchronization or channel estimation in a UE and UpPTS is used for channel estimation in a BS and uplink transmission synchronization in a UE. The GP eliminates UL interference caused by multi-path delay of a DL signal between a UL and a DL.

The radio frame structure is merely exemplary and the number of subframes included in the radio frame, the number of slots included in a subframe, and the number of symbols included in a slot can be vary.

Figure 3:
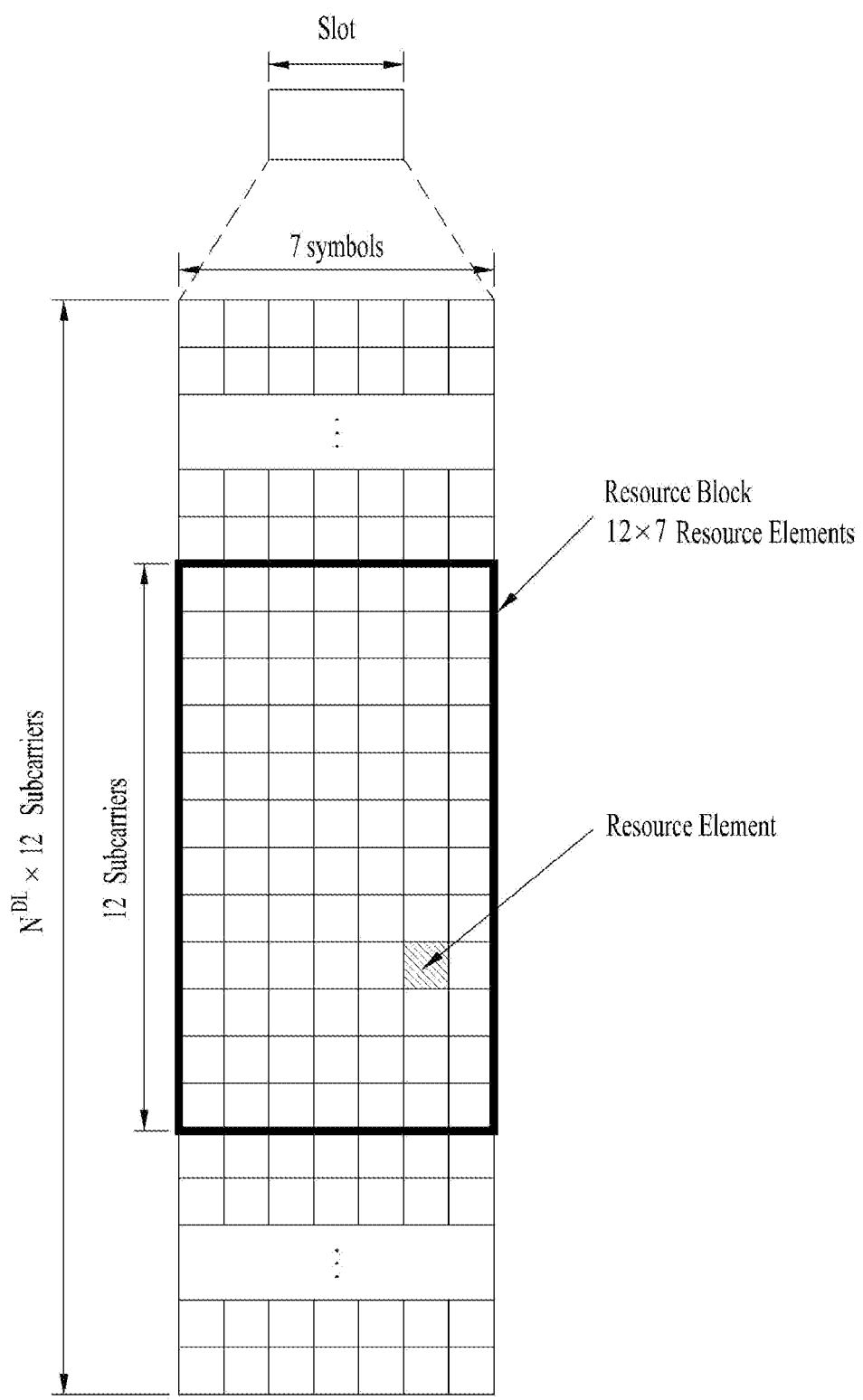
FIG. 3 illustrates a resource grid of a downlink slot.

FIG. 3 illustrates a resource grid of a downlink slot.

Referring to FIG. 3, a downlink slot includes a plurality of OFDM symbols in the time domain. While one downlink slot may include 7 OFDM symbols and one resource block (RB) may include 12 subcarriers in the frequency domain in the figure, the present disclosure is not limited thereto. Each element on the resource grid is referred to as a resource element (RE). One RB includes 12×7 REs. The number NRB of RBs included in the downlink slot depends on a downlink transmit bandwidth. The structure of an uplink slot may be same as that of the downlink slot.

Figure 4:
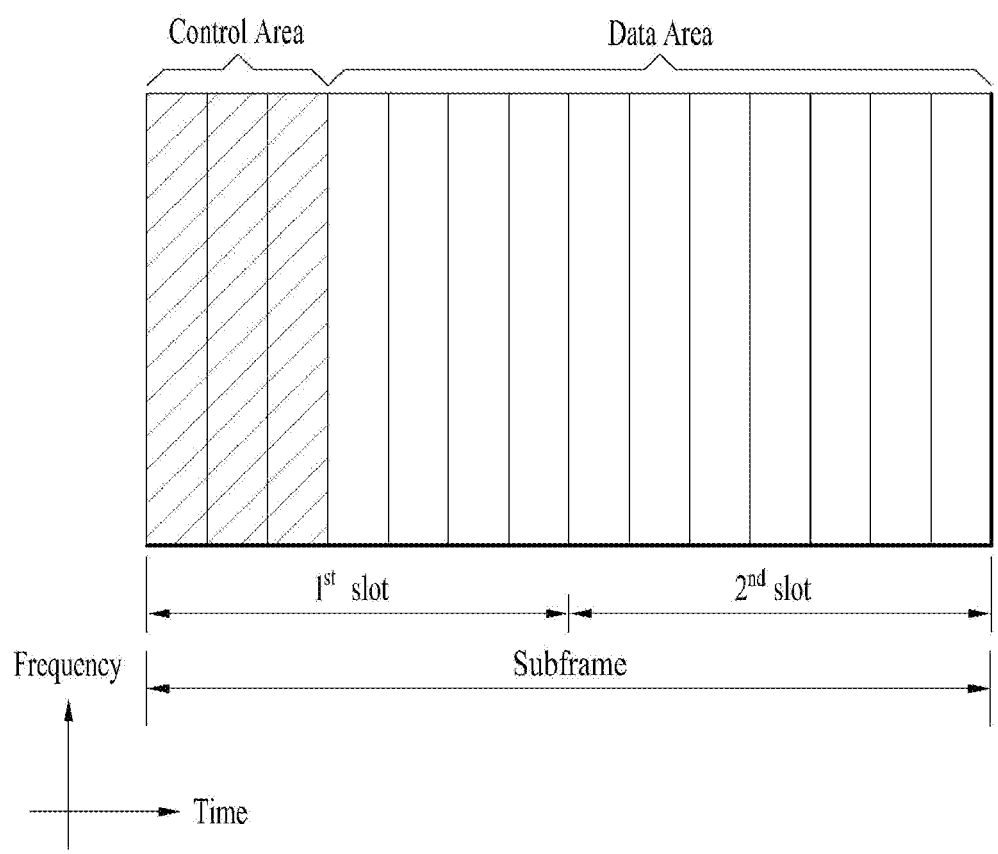
FIG. 4 illustrates a downlink subframe structure.

FIG. 4 illustrates a downlink subframe structure.

Referring to FIG. 4, a maximum of three (four) OFDM symbols located in a front portion of a first slot within a subframe correspond to a control region to which a control channel is allocated. The remaining OFDM symbols correspond to a data region to which a physical downlink shared chancel (PDSCH) is allocated. A basic resource unit of the data region is an RB. Examples of downlink control channels used in LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries a HARQ acknowledgment (ACK)/negative-acknowledgment (NACK) signal. Control information transmitted through the PDCCH is referred to as downlink control information (DCI). The DCI includes uplink or downlink scheduling information or an uplink transmit power control command for an arbitrary UE group.

Control information transmitted through the PDCCH is referred to as downlink control information (DCI). Formats 0, 3, 3A and 4 for uplink and formats 1, 1A, 1B, 1C, 1D, 2, 2A, 2B and 2C for downlink are defined as DCI formats. Information field type, the number of information fields, the number of bits of each information field, etc. depend on DIC format. For example, the DCI formats selectively include information such as hopping flag, RB assignment, MCS (Modulation Coding Scheme), RV (Redundancy Version), NDI (New Data Indicator), TPC (Transmit Power Control), HARQ process number, PMI (Precoding Matrix Indicator) confirmation as necessary. Accordingly, the size of control information matched to a DCI format depends on the DCI format. An arbitrary DCI format may be used to transmit two or more types of control information. For example, DIC formats 0/1A is used to carry DCI format 0 or DIC format 1, which are discriminated from each other using a flag field.

A PDCCH may carry a transport format and a resource allocation of a downlink shared channel (DL-SCH), resource allocation information of an uplink shared channel (UL-SCH), paging information on a paging channel (PCH), system information on the DL-SCH, information on resource allocation of an upper-layer control message such as a random access response transmitted on the PDSCH, a set of Tx power control commands on individual UEs within an arbitrary UE group, a Tx power control command, information on activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). A format of the PDCCH and the number of bits of the available PDCCH are determined by the number of CCEs. The BS determines a PDCCH format according to DCI to be transmitted to the UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging identifier (e.g., paging-RNTI (P-RNTI)) may be masked to the CRC. If the PDCCH is for system information (more specifically, a system information block (SIB)), a system information RNTI (SI-RNTI) may be masked to the CRC. When the PDCCH is for a random access response, a random access-RNTI (RA-RNTI) may be masked to the CRC.

The PDCCH carries a message known as DCI which includes resource assignment information and other control information for a UE or UE group. In general, a plurality of PDCCHs can be transmitted in a subframe. Each PDCCH is transmitted using one or more CCEs. Each CCE corresponds to 9 sets of 4 REs. The 4 REs are referred to as an REG. 4 QPSK symbols are mapped to one REG. REs allocated to a reference signal are not included in an REG, and thus the total number of REGs in OFDM symbols depends on presence or absence of a cell-specific reference signal. The concept of REG (i.e. group based mapping, each group including 4 REs) is used for other downlink control channels (PCFICH and PHICH). That is, REG is used as a basic resource unit of a control region. 4 PDCCH formats are supported as shown in Table 2.

TABLE 2

| PDCCH format | Number of CCEs (n) | Number of REGs | Number of PDCCH bits |
|---|---|---|---|
| 0 | 1 | 9 | 72 |
| 1 | 2 | 8 | 144 |
| 2 | 4 | 36 | 288 |
| 3 | 5 | 72 | 576 |

CCEs are sequentially numbered. To simplify a decoding process, transmission of a PDCCH having a format including n CCEs can be started using as many CCEs as a multiple of n. The number of CCEs used to transmit a specific PDCCH is determined by a BS according to channel condition. For example, if a PDCCH is for a UE having a high-quality downlink channel (e.g. a channel close to the BS), only one CCE can be used for PDCCH transmission. However, for a UE having a poor channel (e.g. a channel close to a cell edge), 8 CCEs can be used for PDCCH transmission in order to obtain sufficient robustness. In addition, a power level of the PDCCH can be controlled according to channel condition.

LTE defines CCE positions in a limited set in which PDCCHs can be positioned for each UE. CCE positions in a limited set that the UE needs to monitor in order to detect the PDCCH allocated thereto may be referred to as a search space (SS). In LTE, the SS has a size depending on PDCCH format. A UE-specific search space (USS) and a common search space (CSS) are separately defined. The USS is set per UE and the range of the CSS is signaled to all UEs. The USS and the CSS may overlap for a given UE. In the case of a considerably small SS with respect to a specific UE, when some CCEs positions are allocated in the SS, remaining CCEs are not present. Accordingly, the BS may not find CCE resources on which PDCCHs will be transmitted to available UEs within given subframes. To minimize the possibility that this blocking continues to the next subframe, a UE-specific hopping sequence is applied to the starting point of the USS.

Table 3 shows sizes of the CSS and USS.

TABLE 3

| PDCCH format | Number of CCEs (n) | Number of candidates in common search space | Number of candidates in dedicated search space |
|---|---|---|---|
| 0 | 1 | — | 6 |
| 1 | 2 | — | 6 |
| 2 | 4 | 4 | 2 |
| 3 | 8 | 2 | 2 |

To control computational load of blind decoding based on the number of blind decoding processes to an appropriate level, the UE is not required to simultaneously search for all defined DCI formats. In general, the UE searches for formats 0 and 1A at all times in the USS. Formats 0 and 1A have the same size and are discriminated from each other by a flag in a message. The UE may need to receive an additional format (e.g. format 1, 1B or 2 according to PDSCH transmission mode set by a BS). The UE searches for formats 1A and 1C in the CSS. Furthermore, the UE may be set to search for format 3 or 3A. Formats 3 and 3A have the same size as that of formats 0 and 1A and may be discriminated from each other by scrambling CRC with different (common) identifiers rather than a UE-specific identifier. PDSCH transmission schemes and information content of DCI formats according to transmission mode (TM) are arranged below.

Transmission Mode (TM)
Transmission mode 1: Transmission from a single base station antenna port
Transmission mode 2: Transmit diversity
Transmission mode 3: Open-loop spatial multiplexing
Transmission mode 4: Closed-loop spatial multiplexing
Transmission mode 5: Multi-user MIMO (Multiple Input Multiple Output)
Transmission mode 6: Closed-loop rank-1 precoding
Transmission mode 7: Single-antenna port (port5) transmission
Transmission mode 8: Double layer transmission (ports 7 and 8) or single-antenna port (port 7 or 8) transmission
Transmission mode 9: Transmission through up to 8 layers (ports 7 to 14) or single-antenna port (port 7 or 8) transmission DCI Format
Format 0: Resource grants for PUSCH transmission
Format 1: Resource assignments for single codeword PDSCH transmission (transmission modes 1, 2 and 7)
Format 1A: Compact signaling of resource assignments for single codeword PDSCH (all modes)
Format 1B: Compact resource assignments for PDSCH using rank-1 closed loop precoding (mod 6)
Format 1C: Very compact resource assignments for PDSCH (e.g. paging/broadcast system information)
Format 1D: Compact resource assignments for PDSCH using multi-user MIMO (mode 5)
Format 2: Resource assignments for PDSCH for closed-loop MIMO operation (mode 4)
Format 2A: Resource assignments for PDSCH for open-loop MIMO operation (mode 3)
Format 3/3A: Power control commands for PUCCH and PUSCH with 2-bit/i-bit power adjustments FIG. 5 illustrates a structure of an uplink subframe used in LTE(-A).

Figure 5:
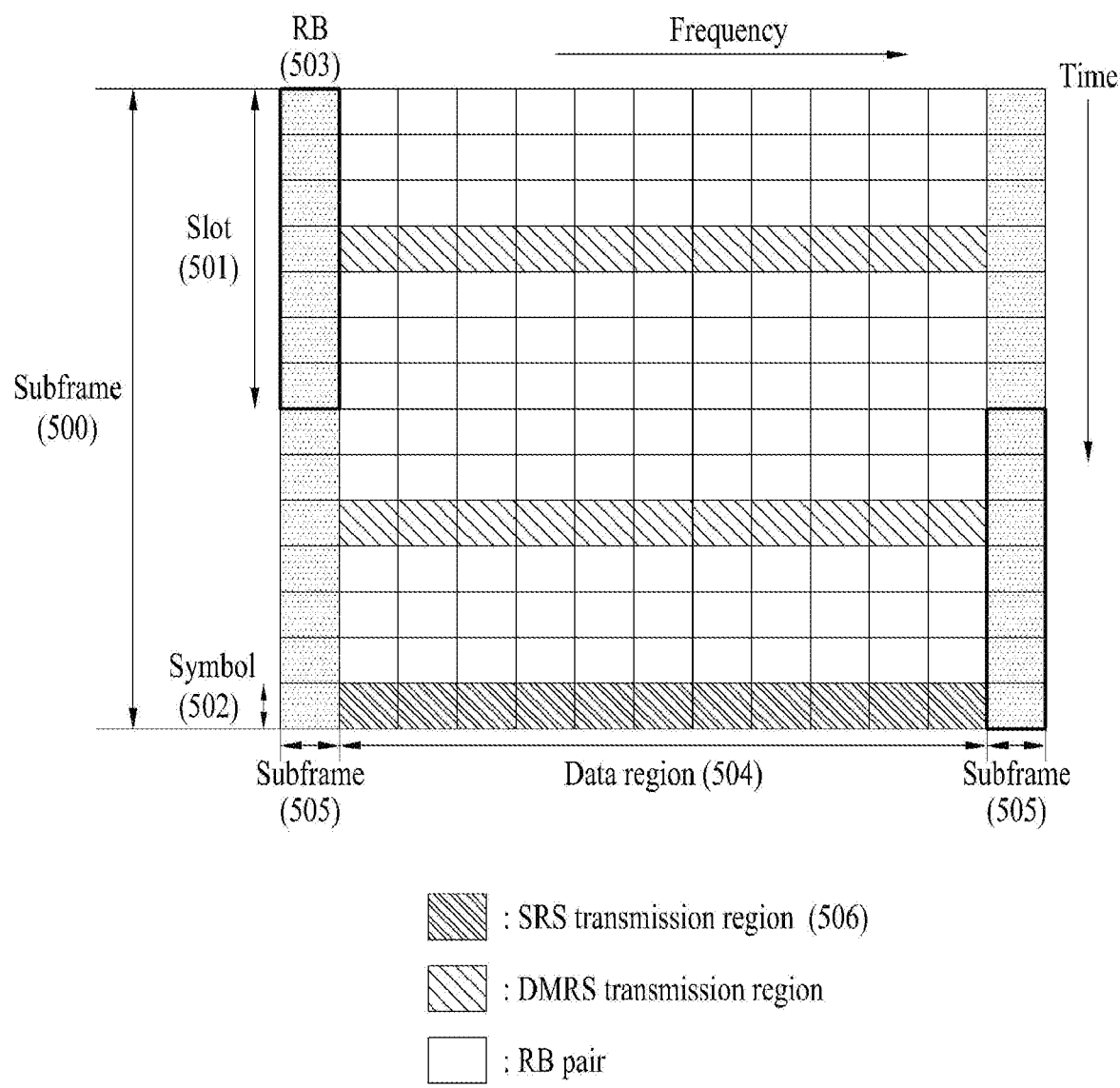
FIG. 5 illustrates the structure of an uplink subframe used in LTE(-A).

Referring to FIG. 5, a subframe 500 is composed of two 0.5 ms slots 501. Assuming a length of a normal cyclic prefix (CP), each slot is composed of 7 symbols 502 and one symbol corresponds to one SC-FDMA symbol. A resource block (RB) 503 is a resource allocation unit corresponding to 12 subcarriers in the frequency domain and one slot in the time domain. The structure of the uplink subframe of LTE(-A) is largely divided into a data region 504 and a control region 505. A data region refers to a communication resource used for transmission of data such as voice, a packet, etc. transmitted to each UE and includes a physical uplink shared channel (PUSCH). A control region refers to a communication resource for transmission of an uplink control signal, for example, downlink channel quality report from each UE, reception ACK/NACK for a downlink signal, uplink scheduling request, etc. and includes a physical uplink control channel (PUCCH). A sounding reference signal (SRS) is transmitted through an SC-FDMA symbol that is lastly positioned in the time axis in one subframe. SRSs of a plurality of UEs, which are transmitted to the last SC-FDMAs of the same subframe, can be differentiated according to frequency positions/sequences. The SRS is used to transmit an uplink channel state to an eNB and is periodically transmitted according to a subframe period/offset set by a higher layer (e.g., RRC layer) or aperiodically transmitted at the request of the eNB.

Figure 6:
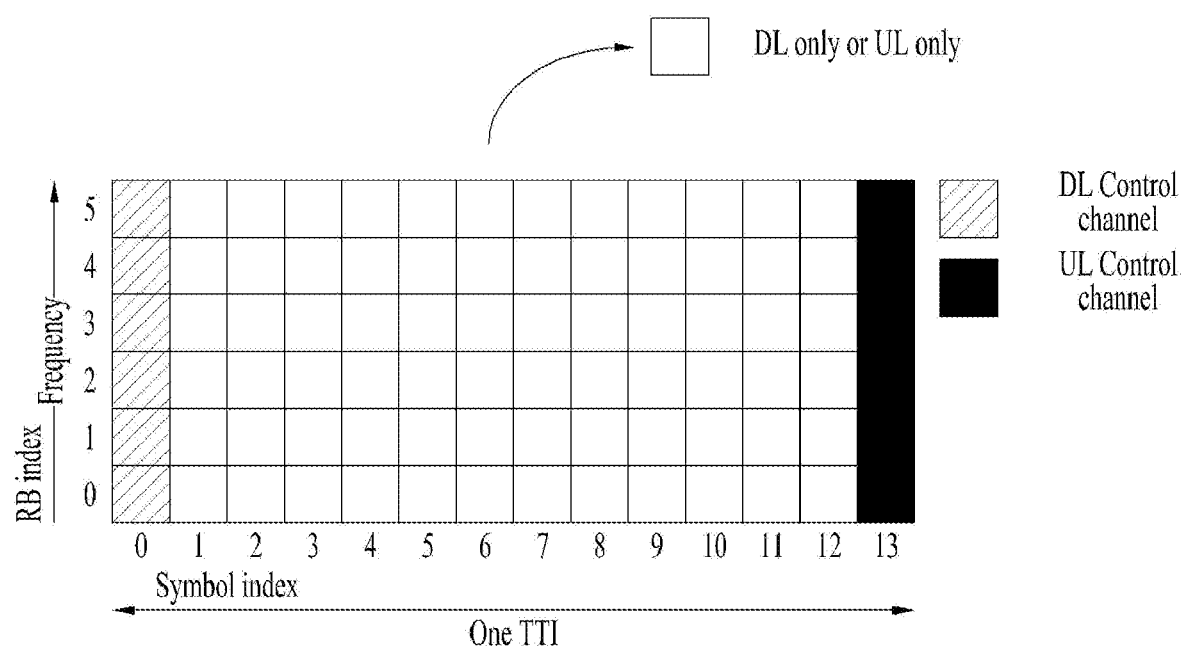
FIG. 6 illustrates the structure of a self-contained subframe.
Figure 15:
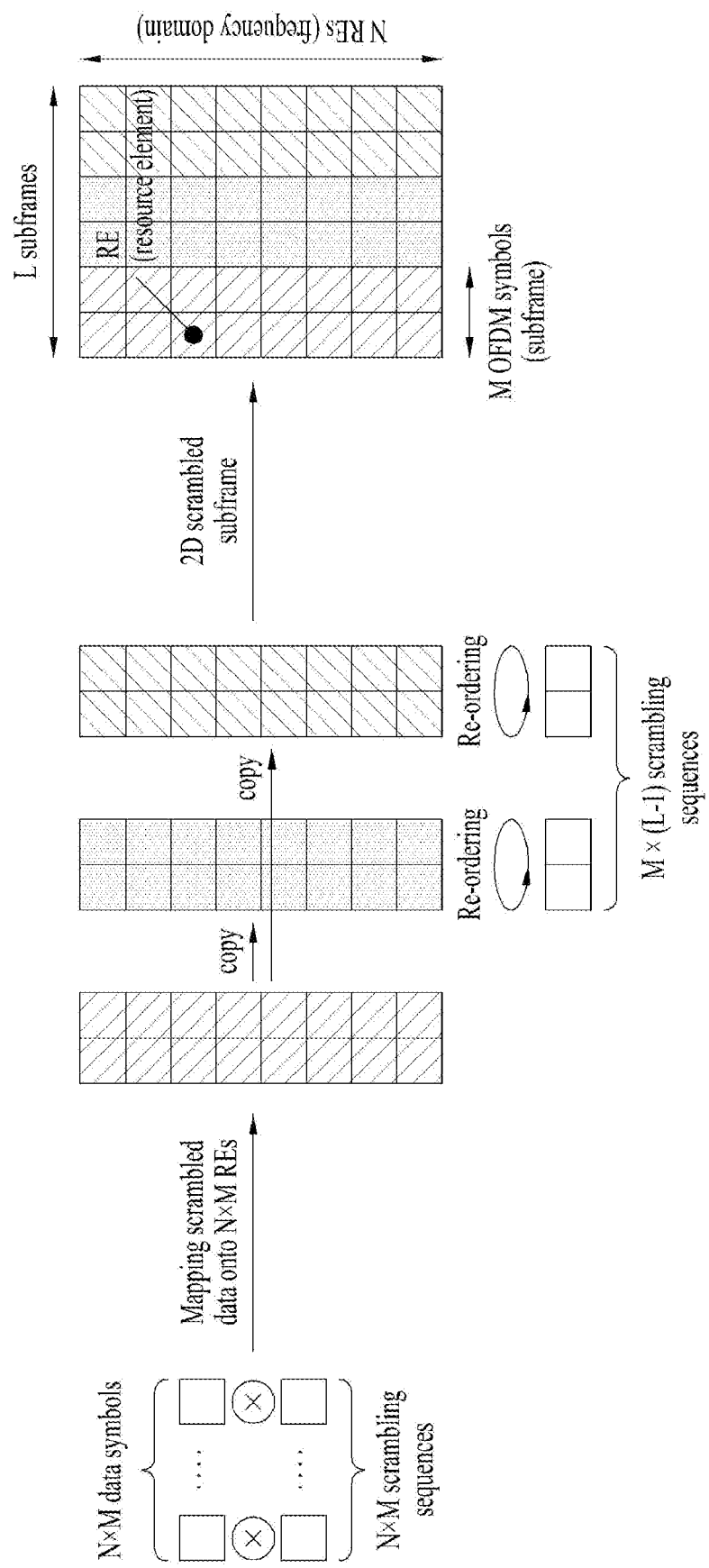

In next-generation RAT (Radio Access Technology), a self-contained subframe is considered in order to minimize data transmission latency. FIG. 6 illustrates a self-contained subframe structure. In FIG. 15, a hatched region represents a DL control region and a black region represents a UL control region. A blank region may be used for DL data transmission or UL data transmission. DL transmission and UL transmission are sequentially performed in a single subframe, and thus DL data can be transmitted and UL ACK/NACK can also be received in a subframe. Consequently, a time taken until data retransmission is performed when a data transmission error is generated is reduced and thus final data delivery latency can be minimized.

As examples of self-contained subframe types which can be configured/set, the following four subframe types can be considered. Respective periods are arranged in a time sequence.

DL control period+DL data period+GP (Guard Period)+ UL control period
DL control period+DL data period
DL control period+GP+UL data period+UL control period
DL control period+GP+UL data period A PDFICH, a PHICH and a PDCCH can be transmitted in the data control period and a PDSCH can be transmitted in the DL data period. A PUCCH can be transmitted in the UL control period and a PUSCH can be transmitted in the UL data period. The GP provides a time gap in a process in which a BS and a UE switch from a transmission mode to a reception mode or in a process in which the BS and the UE switch from the reception mode to the transmission mode. Some OFDM symbols in a subframe at a time when DL switches to UL may be set to the GP.

In 3GPP New RAT (NR) system environment, it may be able to differently configure OFDM numerology (e.g., subcarrier spacing and OFDM symbol duration based on the subcarrier spacing) among a plurality of cells carrier aggregated on a signal UE. Hence, (absolute time) duration of a time resource configured by the same number of symbols (e.g., an SF, a slot, or a TTI (for clarity, commonly referred to as TU (Time Unit)) can be differently configured between CA cells. In this case, a symbol can include an OFDM symbol and an SC-FDMA symbol.

Figure 7:
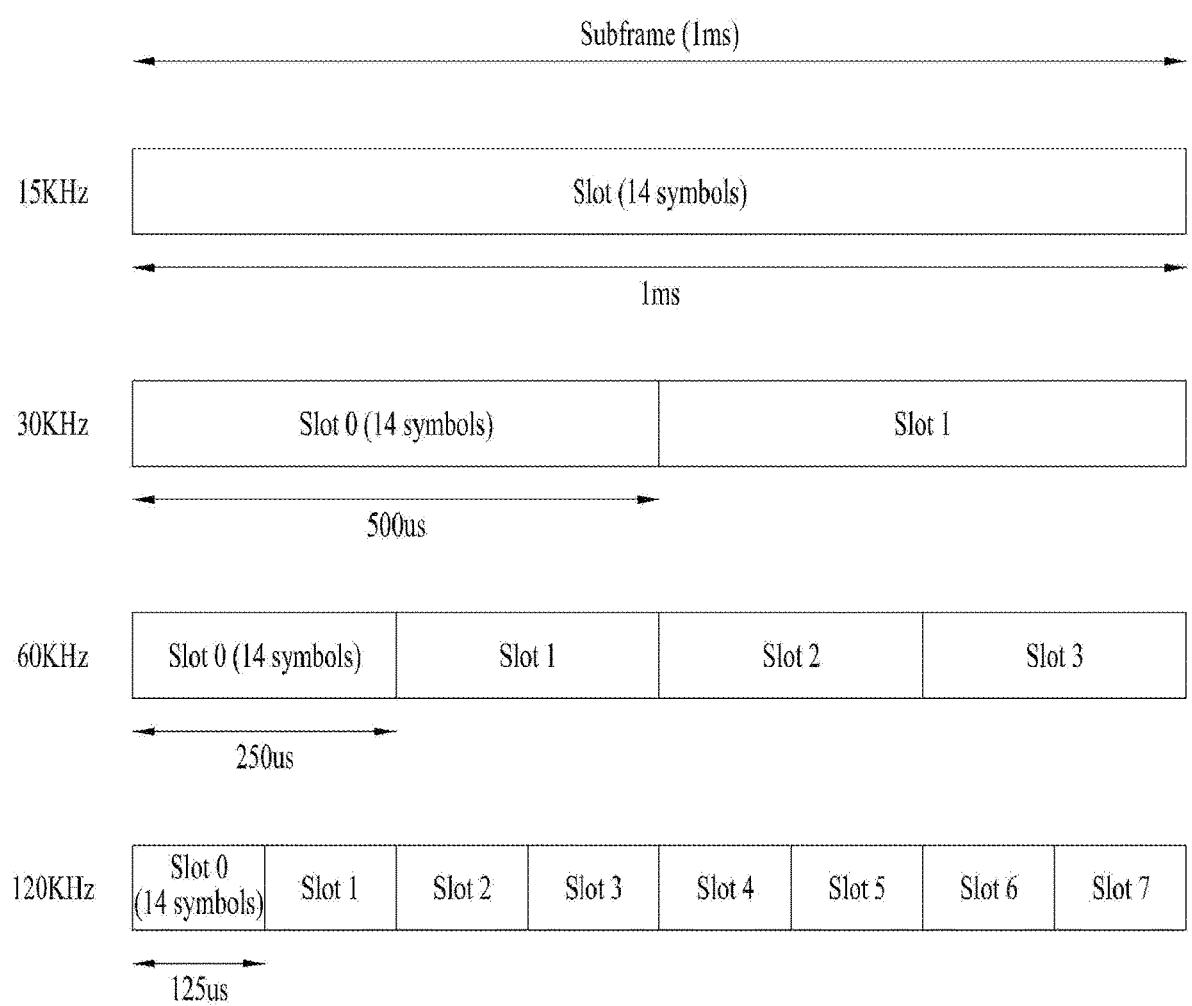
FIG. 7 illustrates a frame structure defined in 3GPP NR.

FIG. 7 illustrates a frame structure defined in 3GPP NR. Similar to a radio frame structure of LTE/LTE-A (refer to FIG. 2), in 3GPP NR, a radio frame includes 10 subframes and each of the subframes has a length of 1 ms. A subframe includes one or more slots and a slot length varies depending on an SCS. 3GPP NR supports SCS of 15 KHz, 30 KHz, 60 KHz, 120 KHz, and 240 KHz. In this case, a slot corresponds to a TTI shown in FIG. 6.

Table 4 illustrates a case that the number of symbols per slot, the number of slots per frame, and the number of slots per subframe vary according to an SCS.

TABLE 4

| SCS (15*2^u) | Number of symbols within slot | Number of slot within frame | Number of slot within subframe |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Hereinafter, narrowband Internet of Things (NB-IoT) will be described. For convenience, although a description will focus on NB-IoT based on the 3GPP LTE standard, the following description may be equally applied even to the 3GPP NR standard. To this end, modification may be made to interpretation of some technical configurations (e.g., LTE band→NR band and subframe→slot).

NB-IoT supports three operation modes: in-band, guard-band, and stand-alone and the same requirements may be applied to each mode.

(1) In-band mode: allocate some of resources in an LTE band to NB-IoT.

(2) Guard-band mode: uses a guard frequency band of LTE and an NB-IoT carrier is deployed as closely as possible to an edge subcarrier of LTE.

(3) Stand-alone mode: allocate some carriers in a GSM band to NB-IoT.

An NB-IoT UE searches for an anchor carrier in a 100-kHz unit for initial synchronization and a center frequency of an anchor carrier in the in-band and the guard-band should be located within ±7.5 kHz from a channel raster of 100 kHz. In addition, 6 physical resource blocks (PRBs) among LTE PRBs are not assigned to NB-IoT. Therefore, the anchor carrier may be located only in a specific PRB.

Figure 8:
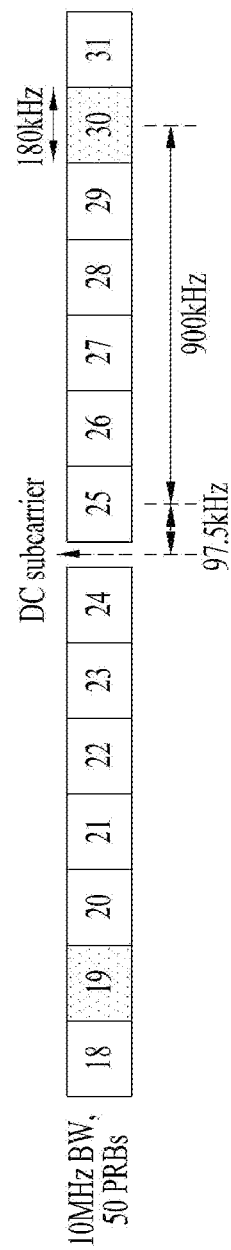
FIG. 8 illustrates deployment of an in-band anchor carrier in an LTE bandwidth of 10 MHz.

FIG. 8 illustrates deployment of an in-band anchor carrier in an LTE bandwidth of 10 MHz.

Referring to FIG. 8, a direct current (DC) subcarrier is located in a channel raster. Since a center frequency spacing between adjacent PRBs is 180 kHz, center frequencies of PRB indexes 4, 9, 14, 19, 30, 35, 40, and 45 are located at ±2.5 kHz from the channel raster. Similarly, a center frequency of a PRB suitable as an anchor carrier at an LTE bandwidth of 20 MHz is located at ±2.5 kHz from the channel raster and center frequencies of PRBs suitable as anchor carriers at LTE bandwidths of 3 MHz, 5 MHz, and 15 MHz are located at ±7.5 kHz from channel raster.

In the guard-band mode, a center frequency of a PRB immediately adjacent to an edge PRB of LTE at bandwidths of 10 MHz and 20 MHz is located at ±2.5 kHz from the channel raster. For bandwidths of 3 MHz, 5 MHz and 15 MHz, guard frequency bands corresponding to 3 subcarriers from the edge PRB may be used to position a center frequency of an anchor carrier at ±7.5 kHz from the channel raster.

The anchor carrier in the stand-alone mode is arranged at a channel raster of 100 kHz and all GSM carriers, including a DC carrier, may be used as NB-IoT anchor carriers.

NB-IoT supports multiple carriers and a combination of in-band+in-band, in-band+guard-band, guard band+guard-band, or stand-alone+stand-alone may be used.

NB-IoT DL uses an OFDMA scheme having a subcarrier spacing of 15 kHz. This provides orthogonality between subcarriers to facilitate coexistence with an LTE system.

NB-IoT DL is provided with physical channels such as a narrowband physical broadcast channel (NPBCH), a narrowband physical downlink shared channel (NPDSCH), and a narrowband physical downlink control channel (NPDCCH) and is provided with physical signals such as a narrowband primary synchronization signal (NPSS), a narrowband primary synchronization signal (NSSS), and a narrowband reference signal (NRS).

The NPBCH delivers a master information block-narrowband (MIB-NB), which is minimum system information necessary for the NB-IoT UE to access a system, to the UE. An NPBCH signal may be transmitted a total of 8 times to improve coverage. A transport block size (TBS) of the MIB-NB is 34 bits and is newly updated at a TTI period of every 640 ms. The MIB-NB includes information such as an operation mode, a system frame number (SFN), a hyper-SFN, the number of cell-specific reference signal (CRS) ports, a channel raster offset, etc.

The NPSS consists of a Zadoff-Chu (ZC) sequence having a length of 11 and a root index of 5. The NPSS may be generated according to the following equation.

$$d_l(n) = S(l) \cdot e^{-j\frac{\pi u n(n+1)}{11}}, n = 0, 1, \ldots, 10 \qquad \text{[Equation 1]}$$

Here, S(l) for an OFDM symbol index l may be defined as shown in Table 5.

TABLE 5

| Cyclic prefix length | S(3), . . . , S(13) |
|---|---|
| Normal | 1  1  1  1  −1  −1  1  1  1  −1  1 |

The NSSS consists of a combination of a ZC sequence having a length of 131 and a binary scrambling sequence such as a Hadamard sequence. The NSSS indicates a physical cell ID (PCID) through the combination of the above sequences to NB-IoT UEs in a cell.

The NSSS may be generated according to the following equation.

$$d(n) = b_q(m) e^{-j2\pi\theta_f n} e^{-j\frac{\pi u n'(n'+1)}{131}} \qquad \text{[Equation 2]}$$

Here, variables applied to Equation 2 may be defined as follows.

$$n = 0, 1, \ldots, 131 \qquad \text{[Equation 3]}$$

$$n' = n \bmod 131$$

$$m = n \bmod 128$$

$$u = N_{ID}^{Ncell} \bmod 126 + 3$$

$$q = \left\lfloor \frac{N_{ID}^{Ncell}}{126} \right\rfloor$$

Here, a binary sequence $b_q(m)$ is defined as shown in Table 6 and $b_0(m)$ to $b_3(m)$ correspond to columns 1, 32, 64, and 128 of a Hadamard matrix of order 128, respectively. A cyclic shift $\theta_f$ for a frame number $n_f$ may be defined as indicated in Equation 4.

TABLE 6

| q | $b_q(0), \ldots b_q(127)$ |
|---|---|
| 0 | [1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1] |
| 1 | [1 −1 −1 1 −1 1 1 −1 −1 1 1 −1 1 −1 1 1 −1 1 1 −1 −1 1 1 −1 −1 1 1 −1 1 −1 1 1 −1 −1 1 1 −1 1 −1 1 −1 −1 1 1 −1 1 1 −1 −1 1 1 −1 1 −1 1 −1 −1 1 1 −1 1 1 −1 −1 1 1 −1 −1 1 1 −1 1 −1 −1 1 1 −1 1 1 −1 −1 1 1 −1 −1 1 1 −1 1 −1 −1 1 1 −1 1 1 −1 −1 1 1 −1 −1 1 1 −1 1 −1 −1 1 1 −1 1 1 −1 −1 1 1 −1 −1 1 1 −1 1 −1 −1 1 1 −1 ] |
| 2 | [1 −1 −1 1 −1 1 1 −1 −1 1 1 −1 1 −1 1 1 −1 1 −1 −1 1 1 −1 −1 1 1 −1 −1 1 −1 1 1 −1 1 −1 −1 1 1 −1 1 1 −1 −1 1 1 −1 1 1 −1 −1 1 1 −1 −1 1 1 −1 −1 1 −1 1 1 −1 1 −1 −1 1 1 −1 −1 1 1 −1 −1 1 1 −1 −1 1 −1 1 1 −1 −1 1 1 −1 1 1 −1 −1 1 1 −1 −1 1 1 −1 −1 1 −1 1 1 −1 1 −1 −1 1 1 −1 −1 1 1 −1 −1 1 −1 1 1 −1 1 −1 −1 1 1 −1 1] |
| 3 | [1 −1 −1 1 −1 1 1 −1 −1 1 1 −1 1 −1 1 1 −1 1 −1 −1 1 1 −1 −1 1 1 −1 −1 1 −1 1 1 −1 1 −1 −1 1 1 −1 1 1 −1 −1 1 1 −1 1 1 −1 −1 1 1 −1 −1 1 1 −1 −1 1 −1 1 1 −1 1 −1 −1 1 1 −1 −1 1 1 −1 −1 1 1 −1 −1 1 −1 1 1 −1 1 −1 −1 1 1 −1 1 1 −1 −1 1 1 −1 1 −1 −1 1 1 −1 −1 1 1 −1 −1 1 −1 1 1 −1 1 −1 −1 1 1 −1 1 1 −1 −1 1 1 −1] |

$$\theta_f = \frac{33}{132}(n_f/2)\bmod 4 \qquad \text{[Equation 4]}$$

Here, $n_f$ denotes a radio frame number and mod denotes a modulo function.

The NRS is provided as a reference signal for channel estimation required for DL physical channel demodulation and is generated in the same manner as in LTE. However, a narrowband-physical cell ID (NB-PCID) (or an NCell ID or an NB-IoT BS ID) is used as an initial value for initialization. The NRS is transmitted through one or two antenna ports (p=2000 or 2001).

The NPDCCH has the same transmit antenna configuration as the NPBCH and carries DCI. The NPDCCH supports three DCI formats. DCI format N0 includes narrowband physical uplink shared channel (NPUSCH) scheduling information and DCI formats N1 and N2 include NPDSCH scheduling information. The NPDCCH may perform a maximum of 2048 repetitive transmissions to improve coverage.

The NPDSCH is used to transmit data (e.g., transport block (TB)) of a transport channel such as a DL-shared channel (DL-SCH) and a paging channel (PCH). A maximum TBS is 680 bits and the NPDSCH may perform a maximum of 2048 repetitive transmissions to improve coverage.

Figure 9:
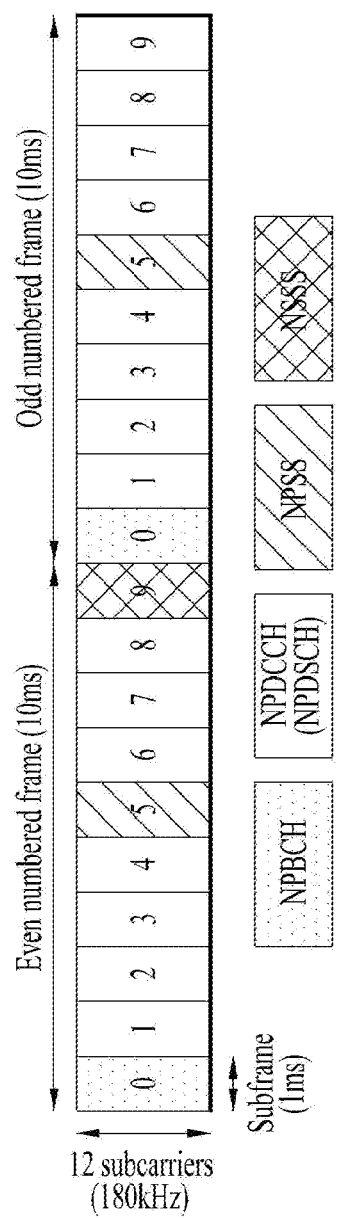
FIG. 9 illustrates locations at which NB-IoT DL physical channels/signals are transmitted in an FDD LTE system.

FIG. 9 illustrates locations at which NB-IoT DL physical channels/signals are transmitted in an FDD LTE system.

Referring to FIG. 9, an NPBCH is transmitted in the first subframe of every frame, an NPSS is the sixth subframe of every frame, and an NSSS is transmitted in the last (e.g., 10th) subframe of every even frame. An NB-IoT UE acquires frequency, symbol, and frame synchronization using synchronization signals (NPSS and NSSS) and searches for 504 physical cell IDs (i.e., BS IDs). An LTE synchronization signal is transmitted through 6 PRBs and an NB-IoT synchronization signal is transmitted through one PRB.

In NB-IoT, a UL physical channel consists of a narrowband physical random access channel (NPRACH) and an NPUSCH and supports single-tone transmission and multi-tone transmission. Single-tone transmission is supported for subcarrier spacings of 3.5 kHz and 15 kHz and multi-tone transmission is supported only for a subcarrier spacing of 15 kHz. On UL, the subcarrier spacing of 15 kHz may maintain orthogonality with LTE to provide optimal performance, whereas the subcarrier spacing of 3.75 kHz may lower orthogonality so that performance deterioration may occur due to interference.

An NPRACH preamble consists of 4 symbol groups and each symbol group consists of a CP and 5 (SC-FDMA) symbols. The NPRACH supports only single-tone transmission with a subcarrier spacing of 3.75 kHz and provides CPs of lengths of 66.7 μs and 266.67 μs to support different cell radii. Each symbol group performs frequency hopping and a hopping pattern thereof is as follows. A subcarrier transmitting the first symbol group is determined in a pseudo-random manner. The second symbol group performs 1-subcarrier hopping, the third symbol group performs 6-subcarrier hopping, and the fourth symbol group performs 1-subcarrier hopping. In the case of repetitive transmission, a frequency hopping procedure is repeatedly applied and the NPRACH preamble may be repeatedly transmitted up to 128 times to improve coverage.

The NPUSCH supports two formats. NPUSCH format 1 is used for UL-SCH transmission and a maximum TBS is 1000 bits. NPUSCH format 2 is used for UL control information transmission such as HARQ ACK signaling. NPUSCH format 1 supports single-/multi-tone transmission and NPUSCH format 2 supports only single-tone transmission. In the case of single-tone transmission, pi/2-binary phase shift keying (BPSK) and pi/4-quadrature phase shift keying (QPSK) are used to reduce a peak-to-average power ratio (PAPR).

In the stand-alone and guard-band modes, all resources included in one PRB may be allocated to NB-IoT. However, in the case of the in-band mode, resource mapping is restricted for coexistence with a legacy LTE signal. For example, in the in-band mode, resources classified as an LTE control channel allocation area (OFDM symbols 0 to 2 of every subframe) may not be allocated to the NPSS/NSSS and an NPSS/NSSS symbol mapped to an LTE CRS RE is punctured.

Figure 10:
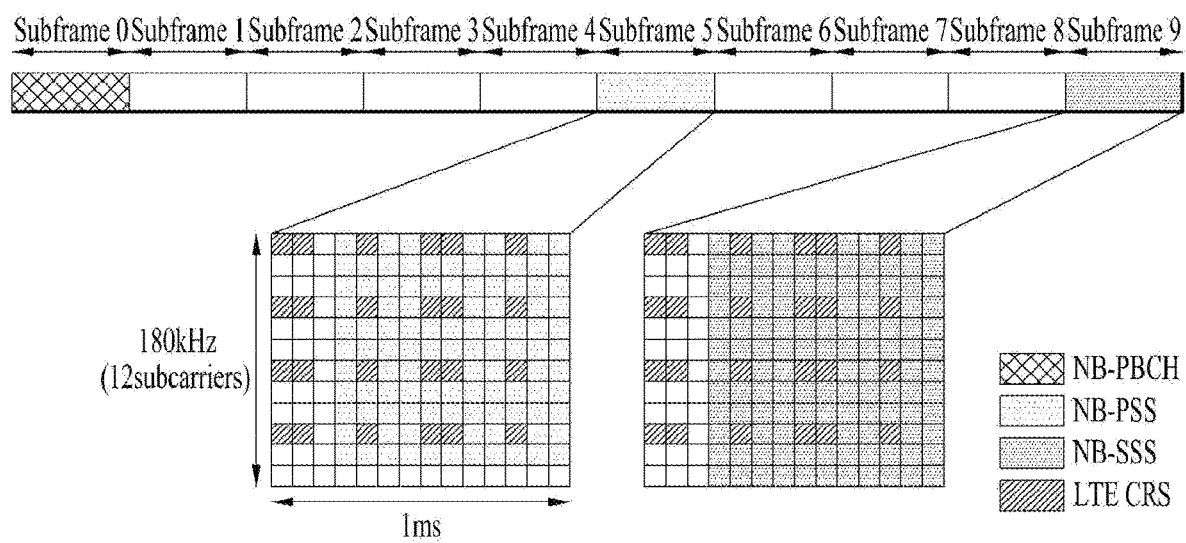
FIG. 10 illustrates resource allocation of an NB-IoT signal and an LTE signal in an in-band mode.

FIG. 10 illustrates resource allocation of an NB-IoT signal and an LTE signal in an in-band mode. Referring to FIG. 10, for ease of implementation, an NPSS and an NSSS are not transmitted in OFDM symbols corresponding to a control region of an LTE system (e.g., the first three OFDM symbols in a subframe) regardless of an operation mode. In addition, an NPSS/NSS RE colliding with an LTE CRS RE on a physical resource is punctured and mapped so as not to affect the LTE system.

After cell search, the NB-IoT UE demodulates an NPBCH in a situation in which system information other than a PCID is absent. Therefore, an NPBCH symbol may not be mapped to the LTE control channel allocation region. In the absence of the system information, since the NB-IoT UE assumes 4 LTE antenna ports (e.g., p=0, 1, 2, and 3) and two NB-IoT antenna ports (e.g., p=2000 and 2001), the NPBCH may not be allocated to an CRS RE and an NRS RE. Therefore, the NPBCH is rate-matched to given available resources.

After NPBCH demodulation, the NB-IoT UE obtains information about the number of CRS antenna ports. However, the NB-IoT UE is not still aware of information about the LTE control channel allocation region. Accordingly, the NPDSCH that transmits system information block type 1 (SIB1) data is not mapped to a resource classified as the LTE control channel allocation region.

However, unlike the NPBCH, an RE that is not actually allocated to an LTE CRS may be allocated to the NPDSCH. After receiving SIB1, since the NB-IoT UE acquires all information related to resource mapping, a BS may map the NPDSCH (except when transmitting SIB1) and the NPDCCH to available resources based on LTE control channel information and the number of CRS antenna ports.

Embodiment: Inter-Cell Interference Mitigation for NB-IoT

The present disclosure proposes an adaptive scrambling method capable of randomizing inter-cell interference while minimizing reception complexity of a UE in an NB-IoT system. The scrambling method of the present disclosure may be used for, but is not limited to, an NPDCCH and an NPDSCH. The present disclosure also proposes a (transmission) symbol-level scrambling and interleaving method for inter-cell interference randomization without greatly increasing complexity of an NB-IoT UE. The proposed methods are not limited to the NB-IoT system and are applicable to any system that allows many repetitive transmissions for a low-power, low-cost UE such as enhanced machine-type communication (eMTC).

1. Reception Complexity and DL Repetitive Transmission of UE

Figure 11:
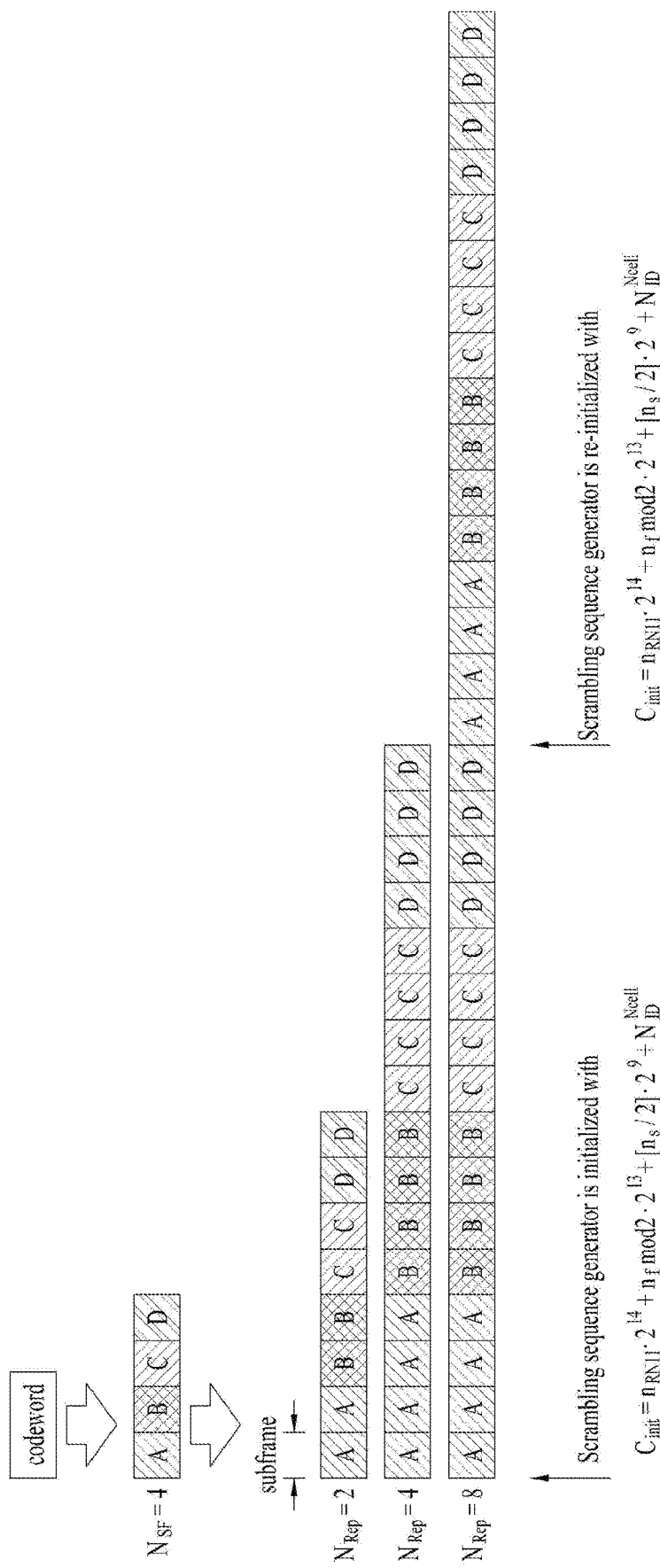
FIG. 11 illustrates a scrambling initialization method of a narrowband physical downlink shared channel (NPDSCH) not carrying broadcast control channel (BCCH) data.

Scrambling of an NPDSCH carrying BCCH (data) is initialized in a subframe in which the NPDSCH is first transmitted and then reinitialized by differing in a slot number in every fourth NPDSCH subframe. In addition, scrambling of an NPDSCH not carrying the BCCH (data) is initialized in a subframe in which a codeword is first transmitted and then reinitialized by differing in a radio frame and a slot number whenever every $\min(M^{PDCCH}_{rep}, 4)$-th repetitive transmission of the codeword is performed. Scrambling initialization of the NPDSCH not carrying the BCCH (data) may be represented as illustrated in FIG. 11 according to $N_{SF}$ and $N_{Rep}$ where $N_{SF}$ denotes the number of subframes in which the codeword is transmitted and $N_{Rep}$ denotes the repetitive number of subframes and is equal to $M^{PDCCH}_{rep}$. In the figure, $n_{RNTI}$ denotes a UE ID (e.g., C-RNRI), $n_f$ denotes a radio frame number, $n_s$ denotes the first slot number used for repetitive transmission in a radio frame, and $N^{Ncell}_{ID}$ denotes an NCell ID (NB-IoT BS ID).

Unlike a method of initializing scrambling in every subframe in a legacy LTE system, the reason why scrambling initialization of the NPDSCH not carrying the BCCH (data) is applied as illustrated in FIG. 11 is that one codeword is repeatedly transmitted in multiple subframes in the NB-IoT system unlike the legacy LTE system. In this case, if scrambling is initialized in every subframe in the same method as in the legacy LTE system, reception complexity of the UE may be greatly increased. In FIG. 11, for example, when $N_{Rep}$ is 8, if scrambling is initialized every time during a duration of 'A' in which repetitive transmission is performed in four subframes, the UE needs to combine 'A' of four times which is repeatedly transmitted by demodulating every subframe. On the other hand, if scrambling is maintained during four subframes, the UE may add all 'A' repeatedly transmitted four times in the time domain, and then perform fast Fourier transformation (FFT) of one time and demodulation. In particular, since reduction of operation complexity is a very important factor for a low-power mode UE such as an NB-IoT UE, a scrambling initialization method different from that used in the legacy LTE system is used.

2. Enhanced Scrambling for Inter-Cell Interference Randomization

As described above, although the scrambling initialization method of the NB-IoT system is efficient in terms of UE complexity, the method is not effective as a method of mitigating interference between adjacent cells. In this regard, there has been a recent demand that scrambling methods of an NPDCCH and an NPDSCH should be improved and modifications to the scrambling methods based on 3GPP Rel-14 NB-IoT are expected to be made. Prior to this, a scrambling method of an NPBCH has already been revised for a similar reason and initialization methods of the NPDCCH and the NPDSCH are also expected to be modified similarly to an initialization method of the NPBCH. However, since effects of the scrambling modification of the NPDCCH and NPDSCH on reception complexity of the UE may be completely different from that of the NPBCH, a more careful modification is required. Before description of this modification, an NPBCH scrambling method revised in 3GPP Rel-13 will be described first.

Table 7 shows a conventional NPBCH repetitive transmission method and Table 8 shows a modified NPBCH repetitive transmission method.

TABLE 7

Conventional method
1) Get a block of complex-valued symbols (=modulation symbols) $y^p$ (N), ..., $y^p$ (N + K − 1)
  N = starting index for the 80ms block (N = 0, 100, ..., 700)
  K = number of symbols in 1 subframe (K = 100)
2) Repeat the same block in 8 consecutive NPBCH subframes

TABLE 8

• Modified method
1) Get a block of complex-valued symbols (=modulation symbols) $y^p$(N), ... , $y^p$ (N + K − 1)
  N = starting index for the 80ms block (N = 0, 100, ..., 700)
  K = number of symbols in 1 subframe (K = 100)
2) For each of the 8 consecutive NPBCH subframes (indices j=0,...,7), the block of K symbols to be transmitted is obtained as follows
  $y_j^p(i) = y^p(i)\theta_j(i)$
Where $\theta(i)$ is obtained as $$\theta_j(i) = \begin{cases} 1 & \text{if } c_j(2i) = 0 \text{ and } c_j(2i+1) = 0 \\ -1 & \text{if } c_j(2i) = 0 \text{ and } c_j(2i+1) = 1 \\ j & \text{if } c_j(2i) = 1 \text{ and } c_j(2i+1) = 0 \\ -j & \text{if } c_j(2i) = 1 \text{ and } c_j(2i+1) = 1 \end{cases}$$

And $c_j(i)$ is a scrambling sequence initialized by $c_{init,j} = N_{ID}^{Ncell} + (n_f \bmod 8)2^9$
$c_j(i), i = 0, ... ,199$ is given by
  $c(n) = (x_1(n + N_C) + x_2(n + N_C)) \bmod 2$
  $x_1(n + 31) = (x_1(n + 3) + x_1(n)) \bmod 2$
  $x_2(n + 31) = (x_2(n + 3) + x_2(n + 2) + x_2(n + 1) + x_2(n)) \bmod 2$
where $N_C = 1600$ and the first m-sequence shall be initialized with $x_1(0) = 1, x_1(n) = 0, n = 1,2,...,30$.
The initialization of the second m-sequence is denoted by $c_{init} = \sum_{i=0}^{30} x_2(i) \cdot 2^i$.

Figure 12:
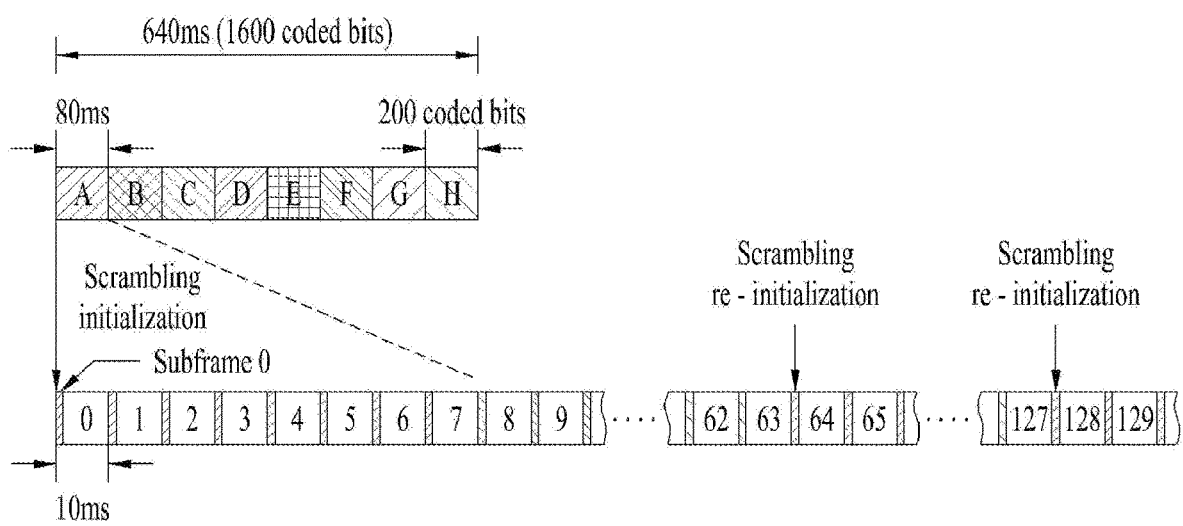
FIG. 12 illustrates narrowband physical broadcast channel (NPBCH) transmission.

FIG. 12 illustrates an NPBCH transmission method. Referring to FIG. 12, a scrambling sequence applied to an NPBCH is initialized with a value of an $N^{Ncell}_{ID}$ every 640 ms. In addition, the NPBCH carries 1600 coded bits for 640 ms and different information blocks A to H transmit bits every 80 ms. Each information block is repeated at intervals of 10 ms within 80 ms. Specifically, the NPBCH is transmitted in the first subframe (e.g., subframe 0) of a radio frame. Quadrature phase shift keying (QPSK) is applied to the NPBCH. 100 complex-symbols (i.e., modulation symbols) are mapped to each subframe.

According to the conventional method of Table 7, the same signal is transmitted every 10 ms within 80 ms (e.g., subframes 8n to 8n+7 where n=0 to 7). Since the NPBCH is always transmitted in the first subframe of a radio frame, the same signal is transmitted even in an RE in which an NRS and a CRS are transmitted.

On the other hand, according to the modified method of Table 8, a different scrambling sequence is additionally applied every 10 ms within 80 ms (e.g., subframes 8n to 8n+7 where n=0 to 7). Here, a scrambling sequence applied for 80 ms may have a complex value as opposed to the conventional method and has a feature that the scrambling sequence is not repeated every 10 ms for 80 ms during which 'A' of FIG. 12 is transmitted. Therefore, before combining a signal transmitted 8 times for 80 ms, a receiver needs to perform descrambling first. Here, since a descrambling operation is a procedure of simply removing a complex value of 1, −1, j, or −j, it may be assumed that no additional complexity is increased. However, in order to perform descrambling of each RE in the frequency domain, it is necessary to perform FFT for each OFDM symbol within 80 ms. Therefore, there may be a disadvantage in that the number of FFT operations of the UE increases as compared with conventional perfect repetitive transmission within 80 ms. However, since 10 ms is not sufficiently short considering a coherence time, it is difficult to combine each OFDM symbol repeated in units of 10 ms within 80 ms before performing FFT for each OFDM symbol even when the conventional scrambling method is performed. For this reason, the modified NPBCH scrambling method may be implemented without additionally increasing complexity of the UE receiver.

An inter-cell interference effect may similarly appear in not only the NPBCH but also in the repeatedly transmitted NPDCCH and NPDSCH. Therefore, almost the same method as the modified NPBCH scrambling method of Table 8 is proposed even for the NPDCCH and the NPDSCH. However, unlike the NPBCH repeated every 10 ms, the NPDCCH and the NPDSCH may be repeatedly transmitted at a period of 1 ms in a DL valid subframe indicated by '1' in DL-bitmap-NB. Here, the valid subframe indicates a subframe in which the NRS is transmitted and the NPDCCH and the NPDSCH may be transmitted. Therefore, when different scrambling sequences are applied to subframes in which the NPDCCH and the NPDSCH are repeatedly transmitted, reception complexity of the UE may be greatly affected unlike the NPBCH. That is, prior to combining the NPDCCH/NPDSCH repeatedly transmitted within a duration shorter than the coherence time, an additional FFT operation may be required.

Tables 9 to 11 show the number of FFT operations of the NPDSCH when a different scrambling sequence is applied to each subframe similarly to the modified NPBCH scrambling method of Table 8. Tables 9 to 11 show an in-band same PCI mode, an in-band different PCI mode, and other operation modes, respectively.

TABLE 9

| | CFI = 1 | | | CFI = 2 | | | CFI = 3 | | |
|---|---|---|---|---|---|---|---|---|---|
| | Existing | Change | Increase | Existing | Change | Increase | Existing | Change | Increase |
| M = 1 | 14 | 14 | 0% | 13 | 13 | 0% | 12 | 12 | 0% |
| M = 2 | 22 | 28 | 27% | 21 | 26 | 24% | 20 | 24 | 20% |
| M = 4 | 38 | 56 | 47% | 37 | 52 | 41% | 36 | 48 | 33% |

TABLE 10

| | CFI = 1 | | | CFI = 2 | | | CFI = 3 | | |
|---|---|---|---|---|---|---|---|---|---|
| | Existing | Change | Increase | Existing | Change | Increase | Existing | Change | Increase |
| M = 1 | 13 | 13 | 0% | 12 | 12 | 0% | 11 | 11 | 0% |
| M = 2 | 17 | 26 | 53% | 16 | 24 | 50% | 15 | 22 | 47% |
| M = 4 | 25 | 52 | 108% | 24 | 48 | 100% | 23 | 44 | 91% |

TABLE 11

| | CFI = 0 (No control region) | | |
|---|---|---|---|
| | Existing | Change | Increase |
| M = 1 | 14 | 14 | 0% |
| M = 2 | 18 | 28 | 56% |
| M = 4 | 26 | 56 | 115% |

Here, M represents the number of repetitions of NPDSCH transmission. When the conventional NPDSCH scrambling method is applied, the same scrambling sequence is applied during M subframe durations. The number of FFT operations of the NPDSCH is different from the number of FFT operations of the NPBCH in that an OFDM symbol in which a CRS and an NRS are transmitted requires an FFT operation every time regardless of whether combining is performed because different signals may be transmitted in M subframe durations in which the CRS and the NRS may transmitted. However, there is a difference in that the CRS is not used in the in-band different PCI mode and a control region is not present in the other operation modes. As may be confirmed from Tables 9 to 11, as the number M of repetitive transmissions increases, complexity greatly increases when the modified NPBCH scrambling method is applied to the NPDSCH relative to the conventional scrambling method.

3. Adaptive Scrambling for NPDCCH and NPDSCH

As described above, the inter-cell interference randomization scrambling method of the NPBCH (see Table 8) is not suitable for the NPDCCH and NPDSCH in terms of complexity of the UE receiver. In particular, for a UE-specific channel, it is necessary to apply inter-cell interference randomization scrambling more carefully. Accordingly, the present disclosure proposes a method of effectively applying a scrambling method for inter-cell interference randomization applied to the NPDCCH and/or the NPDSCH. The proposed method relates to a method of more adaptively applying inter-cell interference randomization scrambling applied to the NPDCCH and/or the NPDSCH according to a radio environment of each UE. The core of the proposed method is not to apply scrambling for inter-cell interference randomization applied to the NPDCCH and/or the NPDSCH to a UE that is not in an interference limited environment. That is, scrambling for inter-cell interference randomization applied to the NPDCCH and/or the NPDSCH may be selectively/adaptively applied only to a UE that is in the interference limited environment.

Various specific methods for this purpose will be described below. For convenience, in the following description, inter-cell interference randomization scrambling means inter-cell interference randomization scrambling applied to the NPDCCH and/or the NPDSCH, unless otherwise specified.

First, inter-cell interference randomization scrambling is needed when the UE receives signals of high power from an inter-cell. However, even in this case, when the inter-cell signals are operated asynchronously with a serving cell or when the difference between arrival times of the inter-cell received signals is larger than a predetermined value, it is difficult to expect an inter-cell interference randomization effect through scrambling. In addition, even when power of the signals received from the inter-cell is high, if power of a signal received from the serving cell is higher or a main reason for performance degradation of the receiver is noise rather than interference, it is difficult to expect performance improvement caused by inter-cell interference randomization scrambling. In addition, even if power of an NRS received from the inter-cell is high, when there is less NPDCCH and NPDSCH scheduling, a demand for inter-cell interference randomization may be reduced.

[Method #1 (Semi-)Static Method]

A BS may enable or disable inter-cell interference randomization scrambling based on a higher layer signal (e.g., RRC). An enabled/disabled condition may be cell-common or UE-specific. In addition, inter-cell interference randomization scrambling may be enabled/disabled only for a specific physical channel. For example, inter-cell interference scrambling may be disabled only for an NPCCH included in a USS and may be enabled for an NPCCH included in a CSS. In addition, inter-cell interference scrambling of the NPDCCH may be disabled only for a specific RNTI type. In addition, inter-cell interference scrambling may be disabled for an NPDSCH scheduled by an NPDCCH having the specific RNTI type. Inter-cell interference scrambling may also be disabled or enabled independently for the NPDCCH and the NPDSCH. For example, inter-cell interference scrambling is disabled for the NPDCCH, whereas whether inter-cell interference scrambling of the NPDCH is enabled/disabled may be explicitly indicated through the NPDCCH (DL grant) that schedules the NPDSCH. Generally, it may be desirable to enable inter-cell interference scrambling for the NPDCCH and/or the NPDSCH, which need to be decoded by all users, not by a particular user. Additionally, unlike an NPDSCH scheduled based on the DL grant, other NPDSCHs (e.g., SIB1-NB and other SIB messages) may always be enabled or disabled or may be enabled or disabled only when a certain condition is satisfied. For example, when an MIB-NB indicates a value lower than a specific value as the number of repetitions of SIB1-NB and/or a TBS of the SIB1-NB, inter-cell interference scrambling may be defined to be disabled. Conditions for (semi-)statically enabling/disabling inter-cell interference scrambling include an RNTI type, an NPDCCH type (CSS or USS), the maximum number of repetitions of the NPDCCH, an NPDCCH aggregation level, a coverage extension (CE) level, number of repetitions of the NPDSCH, an NPDSCH MCS, an NPDSCH TBS, an NPDSCH code rate, etc., which may be applied together in a non-exclusive manner. For example, when the BS operates CE levels 0, 1, and 2, the NPDSCH higher than a specific code rate (a TBS, an MCS, or the number of repetitions of the NPDSCH) may be scheduled for a UE belonging to CE level 0. In this case, since an SINR situation of the UE may be regarded as good, inter-cell interference scrambling of the NPDCCH and/or the NPDSCH may be disabled.

There may be a situation in which inter-cell interference scrambling may always be enabled, for example, when the number of consecutive DL subframes in TDD is not sufficient. An advantage obtained when inter-cell interference scrambling is disabled is to minimize additional increase in complexity of the UE. However, when the number of consecutive DL subframes is not sufficient, since OFDM symbol-level combining may not be effectively applied, inter-cell interference scrambling may always be enabled according to a duplex mode and/or TDD UL/DL configuration. For the same reason, inter-cell interference scrambling may always be enabled even in FDD according to DL valid subframe configuration. In addition, even in TDD and FDD, inter-cell interference scrambling may be enabled or disabled for the NPDCCH and the NPDSCH by further considering other conditions (e.g., the number of repetitive transmissions).

In contrast, there may be a situation in which inter-cell interference scrambling may always be disabled. For example, when cell operation between adjacent BSs is asynchronous, inter-cell interference scrambling may not help to improve reception performance of the UE. As another example, in an environment in which adjacent BSs operate networks using different carriers or in an isolated cell environment, inter-cell interference scrambling may always be disabled.

Enabling/disabling inter-cell interference scrambling may be applied independently to an anchor carrier and a non-anchor carrier. For example, the anchor carrier may have high inter-cell interference, whereas there may be an environment in which inter-cell interference scrambling may be disabled for the non-anchor carrier by allocating different PRBs between cells. That is, the mentioned conditions/parameters that may enable/disable inter-cell interference scrambling may be applied differently/independently with respect to the anchor carrier and the non-anchor carrier. In addition, the UE may receive a new parameter set and condition related to inter-cell interference scrambling for the non-anchor carrier in the process of configuring the non-anchor carrier.

[Method #2 Dynamic Method]

Inter-cell interference scrambling may be enabled or disabled during every NPDCCH and/or NPDSCH transmission or inter-cell interference scrambling may be enabled/disabled in a specific period unit. Here, dynamically enabling/disabling inter-cell interference scrambling may include a method of enabling/disabling inter-cell interference scrambling according to an NPDCCH and/or NPDSCH condition at a specific moment based on the (semi-)statically preset parameter set and condition (of Method #1). For example, whether inter-cell interference scrambling is enabled/disabled for a specific RNTI type may be indicated through a higher layer (e.g., RRC) and inter-cell interference scrambling for the NPDSCH may actually be enabled/disabled through the NPDCCH.

First, as a method of enabling/disabling inter-cell interference scrambling in a specific period unit, a specific period and duration may be set through a higher layer (e.g., RRC) and inter-cell interference scrambling may be enabled/disabled through the NPDCCH, the NPDSCH, or third signaling (e.g., paging, or a newly added sequence and channel for power consumption reduction such as paging skipping) in a predetermined time duration. To this end, the UE may blind-decode a DCI format different from a legacy DCI format during the predetermined specific time duration or interpret the DCI format differently from a conventional interpretation method. In addition, an indication of enabling/disabling inter-cell interference randomization scrambling may be included in a sequence for scrambling DCI and in CRC masking information. In addition, the indication of enabling/disabling inter-cell interference randomization scrambling in a corresponding duration may be applied up to the next duration and may be indicated in advance even when related information is not detected in the next duration. Further, a predetermined specific duration and period may be updated or may expire every inter-cell interference scrambling enabling/disabling period. In consideration of missing/false alarm of the UE for the indication of enabling/disabling inter-cell interference scrambling, enabling/disabling inter-cell interference scrambling may not be indicated under a specific condition or enabling/disabling inter-cell interference scrambling may be reset when the NPDCCH is not detected for a prescribed time or more (fallback method). Even after indicating inter-cell interference randomization scrambling, the BS may not perform or follow the indicated enabling/disabling until a specific duration or condition is satisfied in consideration of missing/false alarm of the UE.

Together with the above method, inter-cell interference scrambling may be enabled/disabled during every NPDSCH scheduling, which may be indicated through the NPDCCH that schedules the corresponding NPDSCH. As described in Method #1, an NPDCCH search space, RNTI type information, etc., to/for which enabling/disabling of adaptive inter-cell interference scrambling may be applied/supported, may be preset by a (semi-)static method rather than a dynamic method.

[Method #3 UE Request Based Method]

Determination of an environment suitable for applying inter-cell interference scrambling may be indirectly performed from the viewpoint of the BS or whether to apply enabling/disabling of inter-cell interference scrambling may be directly determined at the request of the UE. Here, the method of indirectly determining whether to apply inter-cell interference scrambling includes parameter combinations described in Method #1 and Method #2 and may be additionally performed based on an open-loop link adaptation of the BS. As an example of the open-loop link adaptation-based method, if ACK for NPDSCH transmission at a rate higher than a specific code rate is frequently reported from the UE in the process of UL/DL scheduling, the BS may indirectly determine that the environment has little inter-cell interference. Here, the code rate includes an MCS, a TBS, the number of repetitions of the NPDCCH, etc. and the number of repetitions of the NPDSCH may also be the indirect determination basis. For example, if ACK or NACK is reported for an NPDSCH scheduled by an NPDCCH of the number of repetitions and an aggregation level, smaller than a specific value, or if an NPUSCH scheduled by the NPDCCH of the number of repetitions and an aggregation level, smaller than a specific value, is received from the UE, the BS may be indirectly aware that a wireless environment of the UE is not an inter-cell interference limited environment. In a similar manner, the distance between the BS and the UE may be roughly inferred according to a CE level and a timing advance (TA) value of the UE and, based on this, the BS may be indirectly aware of whether an environment is an inter-cell interference limited environment. Such indirect determination of whether an environment is an inter-cell interference environment may be implemented by various methods in the BS in most cases.

On the other hand, there may be a method in which the UE directly requests that enabling/disabling inter-cell interference scrambling be applied. In this case, the BS may use Method #1 and Method #2 as a method of responding to the inter-cell interference scrambling enabling/disabling request of the UE. Meanwhile, since the BS may enable/disable inter-cell interference scrambling according to the request of the UE, the request of the UE may be a report on an inter-cell interference level other than an explicit inter-cell interference scrambling enabling/disabling request. In the present disclosure, the inter-cell interference scrambling enabling/disabling request and the report on the inter-cell interference level are collectively referred to as an inter-cell interference information report without distinguishing therebetween.

The inter-cell interference information report may be performed by the UE in an indirect or direct manner with respect to the BS in an NPRACH (msg1) resource selection or msg3 transmission step of a random access procedure. Accordingly, the BS may indicate enabling/disabling of inter-cell interference scrambling through a random access response (RAR, msg2) or msg4. Alternatively, the BS may instruct the UE to transmit an NPDCCH ordered NPRACH. In this process, the UE may report inter-cell interference information in a similar procedure to the above method and the BS may indicate enabling/disabling of inter-cell interference randomization scrambling. As another method using the random access procedure, the UE may additionally inform the BS of the inter-cell interference information report in a buffer status reporting (BSR) or data volume and power headroom reporting procedure.

The UE transmits an ACK/NACK report on the NPDSCH on a resource indicated by a DL grant. In this case, the UE may multiplex and transmit the inter-cell interference information report. In addition, a new type of channel and procedure for the inter-cell interference information report, rather than an ACK/NACK report for the NPDSCH, may be defined. For example, a trigger condition of other purposes except for NPDSCH scheduling may be defined as a condition for triggering NPUSCH format 2. The BS may receive the inter-cell interference information report using NPUSCH format 2. Alternatively, the BS may instruct the UE to transmit NPUSCH format 1 using a UL grant. In this case, a method of indicating the contents transmitted in NPUSCH format 1 by the inter-cell interference information report, rather than user data (e.g., UL-SCH data), may be newly defined. Alternatively, there may be a method of indicating the inter-cell interference information report by defining a third format other than NPUSCH formats 1 and 2. An NPDCCH detection operation performed by the UE after NPUSCH transmission may be defined differently from a conventional method. For example, a procedure may be modified to expect instruction of the BS based on Method #2.

4. (Transmission) Symbol-Level Scrambling and Interleaving for Inter-Cell Interference Randomization When the method of Table 8 is applied without change for inter-cell interference randomization of the NPDCCH and/or the NPDSCH, a scrambling sequence is multiplied by all REs (or modulation symbols) throughout an NPDCCH and/or NPDSCH subframe. That is, when the NPDCCH and/or the NPDSCH is repeatedly transmitted during N subframes, scrambling sequences of the number of REs (or modulation symbols) of one subframe length generated in a starting subframe are not repeated during N subframes, and different scrambling sequences generated in each subframe are multiplied by an I/Q phase of each RE (or modulation symbol) to allow an inter-cell transmission signal to be maximally randomized at an RE (or modulation symbol) level. This increases operation complexity of the NB-IoT UE for inter-cell interference randomization as described above. To solve this problem, the present disclosure proposes a method of randomizing inter-cell interference while minimizing reception complexity of the NB-IoT UE. The proposed method may be used to expect the same or similar effect not only for an NB-IoT system but also for any system using repetitive transmission in a narrow band and may be applied to DL, UL, and any link direction such as sidelink. In particular, scrambling and interleaving proposed by the present disclosure may be similarly applied between repeated symbols even if there are some repeated symbols although transmission is not completely repeated transmission. In addition, the present disclosure may be applied to a system in which one or more data are modulated and transmitted during a specific symbol duration such as single carrier (SC) OFDM (=SC-FDMA) rather than an OFDM-based communication system. For convenience of description, the proposed method will be described based on an OFDM-based NB-IoT DL system.

Figure 13:
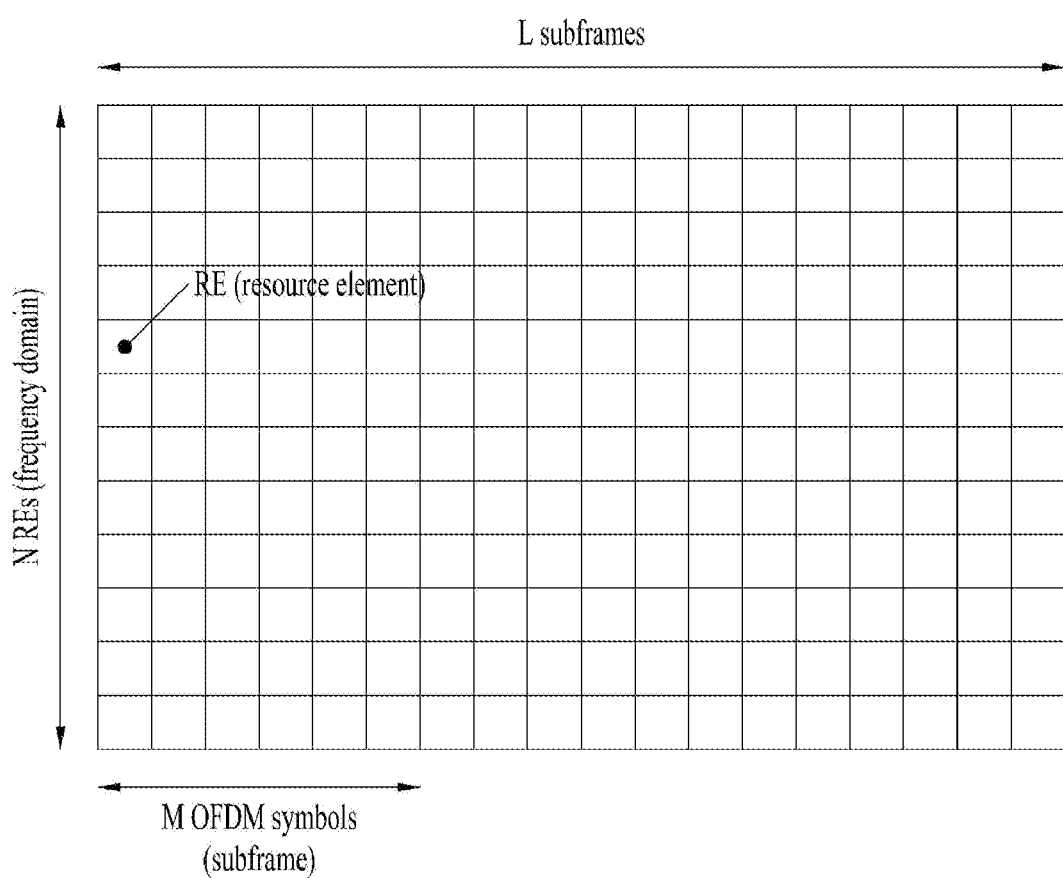
FIG. 13 illustrates a system model for explaining a scrambling scheme.

For description, it is assumed that the system is configured such that N REs (e.g., 12 REs) are present in one transmission symbol in the frequency domain, data is transmitted in units of subframes each consisting of M transmission symbols, and one subframe is repeatedly transmitted during L subframes, as illustrated in FIG. 13. That is, N*M data (or demodulation symbols) are mapped and transmitted in one subframe, which is repeatedly transmitted L times to improve reception SNR of the UE. Here, the subframe corresponds to a minimum data bundle repeatedly transmitted and may be replaced with another term such as a slot. According to configuration/scheduling, one data may be transmitted in P subframes. In this case, data may be transmitted in P*L subframes (or slots). Here, the data may include DCI for the NPDCCH, a TB for the NPDSCH, and the TB or UCI (e.g., ACK/NACK) for the NPUSCH. In addition, it is assumed to easily describe the core of the proposal that reference signals for demodulation (e.g., an NRS and a DMRS) are not included. The NPDCCH/NPDSCH may be mapped to 12 subcarriers and the NPUSCH may be mapped to 1, 3, 6, or 12 subcarriers.

[Method #4 Symbol-Level Scrambling]

Symbol-level scrambling proposed is a method of applying primary scrambling at an RE-level during a specific time duration and then applying secondary scrambling at a (transmission) symbol-level during a repetitive transmission duration. Here, primary scrambling of the RE-level includes scrambling data (e.g., codewords) at a bit-level or a modulation symbol-level. If primary scrambling of the RE-level includes scrambling at the modulation symbol-level, data may include data to which scrambling at the bit-level is applied before primary scrambling. In addition, the specific time duration includes a time duration (e.g., P subframes/slots) in which one data is transmitted. Here, the transmission symbol includes an OFDM symbol or an SC-FDMA symbol. This method may be applied to physical channels (e.g., NPDCCH, NPDSCH, and NPUSCH) repeatedly transmitted in the time domain.

Primary scrambling includes a process of applying a scrambling sequence of a length of N or N*2 for N REs in one transmission symbol or applying a scrambling sequence of a length of N*M or N*M*2 for N*M REs in one subframe (or slot). Here, when the length of the scrambling sequence is twice the length of data, scrambling may be performed on an I/Q phase of each data RE. Initialization of the scrambling sequence for primary scrambling may occur in the first transmission symbol (e.g., beginning of a subframe) or in the first subframe duration (e.g., start of a radio frame or the first subframe within a repeatedly transmitted subframe duration).

Table 12 illustrates a primary scrambling process of an RE-level.

TABLE 12

1) Get a block of complex-valued symbols (=modulation symbols) $y^p(0), \ldots, y^p(K-1)$
   K = number of complex-valued symbols in 1 subframe (or slot)
2) The K complex-valued symbols to be transmitted is obtained as follows
   $\tilde{y}^p(i) = y^p(i)\theta(i)$
   Where $\theta(i)$ is obtained as $$\theta(i) = \begin{cases} 1 & \text{if } c(2i) = 0 \text{ and } c(2i+1) = 0 \\ -1 & \text{if } c(2i) = 0 \text{ and } c(2i+1) = 1 \\ j & \text{if } c(2i) = 1 \text{ and } c(2i+1) = 0 \\ -j & \text{if } c(2i) = 1 \text{ and } c(2i+1) = 1 \end{cases}$$

And $c_j(i)$ is a scrambling sequence initialized [at 1st subframe of repeated subframes (see, fugure 11)] by
- $c_{init} = (N_{ID}^{Ncell} + 1)((10n_f + \lfloor n_s/s \rfloor) \mod 8192 + 1)2^9 + N_{ID}^{Ncell}$ for NPDCCH
- $c_{init} = (N_{RNTI} + 1)((10n_f + \lfloor n_s/s \rfloor) \mod 61 + 1)2^9 + N_{ID}^{Ncell}$ for NPDSCH
$c(i), i = 0, \ldots, 2N-1$ is given by
   $c(n) = (x_1(n + N_C) + x_2(n + N_C)) \mod 2$
   $x_1(n + 31) = (x_1(n + 3) + x_1(n)) \mod 2$
   $x_2(n + 31) = (x_2(n + 3) + x_2(n + 2) + x_2(n + 1) + x_2(n)) \mod 2$
where $N_C = 1600$ and the first m-sequence shall be initialized with $x_1(0) = 1, x_1(n) = 0, n = 1, 2, \ldots, 30$.
The initialization of the second m-sequence is denotted by $c_{init} = \Sigma_{i=0}^{30} x_2(i) \cdot 2^i$.

Secondary scrambling includes a process of performing scrambling at a (transmission) symbol-level while a transmission symbol or subframe to which primary scrambling of the RE-level is applied is repeatedly transmitted. Here, symbol-level scrambling is to perform the same scrambling for all REs during a (transmission) symbol duration and a specific scrambling sequence is equally applied to all REs of a (transmission) symbol. That is, one value in a scrambling sequence may be equally applied to N data (e.g., modulation symbols) or two values may be equally applied to an I/Q phase. A sequence of secondary scrambling may be generated using a value such as a cell ID (e.g., $N^{Ncell}_{ID}$) and thus different scrambling sequences between inter-cells may be applied to the (transmission) symbol. In this case, the UE may descramble and then combine each (transmission) symbol in the time domain before performing FFT for (transmission) symbols repeatedly transmitted L times in L subframes. Therefore, since the UE may perform RE-level descrambling after performing FFT only once, there is an advantage that reception complexity does not increase.

Table 13 illustrates a secondary scrambling process of a (transmission) symbol-level.

(5) A scrambling sequence having a length of M×(L−1) may be generated. In this case, one scrambling sequence value (e.g., 1/−1 or j/−j) may be equally applied to N REs (or modulation symbols) transmitted in one (transmission) symbol. When separately scrambling an I/Q phase, two sequence values may be used for one (transmission) symbol and a scrambling sequence having a length of M×(L−1)×2 may be generated. In addition, sequences used for (transmission) symbol-level scrambling may be generated such that as different scrambling sequences as possible are applied between inter-cells using a cell ID. In addition, the scrambling sequence having a length of M×L or M×L×2 may also be generated according to an implementation method. In this case, secondary scrambling may be applied even to the first subframe in which data is transmitted.

TABLE 13

1) Get a block of complex-valued symbols (=modulation symbols) $y_0^p(0), \ldots, y_0^p(M \cdot N - 1)$
   M = number of OFDM symbols in a subframe
   N = number of complex-valued symbols in an OFDM symbol (e.g., N = 12)
2) The complex-valued symbols to be transmitted in a subframe #s (s = 1, ..., L−1) is obtained as follows
   $\tilde{y}_s^p(i) = y_0^p(i)\theta((s-1) * M + \lfloor i/N \rfloor)$
   Where $\theta(l)$, q = 0, ..., M(L − 1) − 1 is obtained as $$\theta(l) = \begin{cases} 1 & \text{if } c(2l) = 0 \text{ and } c(2l+1) = 0 \\ -1 & \text{if } c(2l) = 0 \text{ and } c(2l+1) = 1 \\ j & \text{if } c(2l) = 1 \text{ and } c(2l+1) = 0 \\ -j & \text{if } c(2l) = 1 \text{ and } c(2l+1) = 1 \end{cases}$$

$c_j(i)$, i = 0, ..., 2M(L − 1) − 1 is a scrambling sequence initialized using a value associated with $N_{ID}^{Ncell}$.

On the other hand, when data and a reference signal (e.g., NRS) are multiplexed in one (transmission) symbol, since secondary scrambling is applied only to the data descrambling/combining of a (transmission) symbol-level may not be performed for the corresponding (transmission) symbol. Therefore, when the reference signal is included in a specific (transmission) symbol, FFT should be performed for each (transmission) symbol and symbol-level descrambling and RE-level descrambling should be performed at the RE-level in the frequency domain. In addition, the (transmission) symbol including the reference signal may be applied only to RE-level scrambling when another UE needs to use the reference signal. However, when the reference signal is transmitted on all REs in the (transmission) symbol or there is no data to be scrambled in the corresponding (transmission) symbol, the above-described method may be applied without change.

Figure 14:
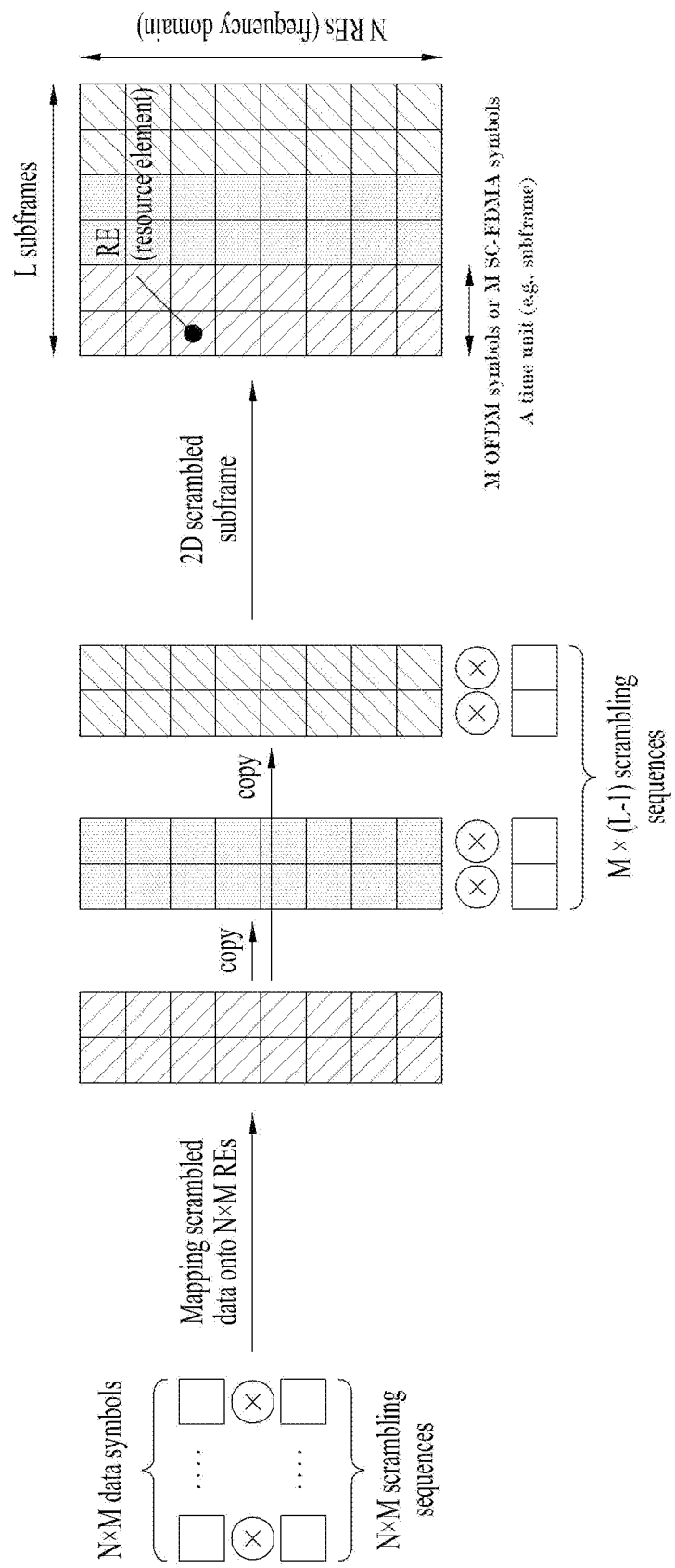
FIGS. 14 to 16 illustrate signal transmission according to the present disclosure.

FIG. 14 illustrates a process according to Method #4 and an operation order is as follows.

(1) One subframe consisting of N×M data (modulation) symbols may be generated.

(2) A scrambling sequence generator may be initialized and a scrambling sequence having a length of N×M may be generated. When scrambling is applied to an I/Q phase, a scrambling sequence having a length of N×M×2 may be generated.

(3) Each data (modulation) symbol and sequence of (1) and (2) may be scrambled in one-to-one correspondence and mapped to N×M REs (primary scrambling) (see Table 12).

(4) The scrambled first subframe may be copied into (L−1) subframes. Here, copying the subframe may be variously implemented as the meaning of repeatedly transmitting data of the first subframe in (L−1) subframes.

(6) In unit of a (transmission) symbol of a subframe, a scrambling is performed with a scrambling sequence in one-to-one correspondence (secondary scrambling) (see Table 13).

(7) L generated subframes may be sequentially transmitted. In this case, sequential transmission does not necessarily need to be consecutive in the time domain. Here, transmitting the subframes means transmitting data in the corresponding subframes.

[Method #5 Symbol-Level Interleaving]

Symbol-level interleaving proposed is a method of performing primary scrambling of data at an RE-level and/or a (transmission) symbol-level during a specific time duration (see Tables 12 and 13) and then performing secondary interleaving for a transmission order of symbols at the (transmission) symbol-level during a repeated transmission duration. Here, the data may include data to which scrambling is applied at a bit-level before primary scrambling. The specific time duration includes a time duration (e.g., P subframes/slots) in which one data is transmitted.

The primary scrambling method includes performing scrambling at the RE-level and/or the (transmission) symbol-level for N*M data within a subframe duration. For example, primary scrambling includes a process of applying a scrambling sequence having a length of N*M or N*M*2 to N*M REs in one subframe (or slot). Here, when the length of the scrambling sequence is twice the length of the data, scrambling may be performed for an I/Q phase of each data RE. Initialization of the scrambling sequence for primary scrambling may occur in the first transmission symbol (e.g., beginning of a subframe) or in the first subframe duration (e.g., start of a radio frame or the first subframe within a repeatedly transmitted subframe duration).

Secondary (transmission) symbol-level interleaving is a procedure of randomly interleaving a (transmission) symbol transmission order within each subframe when the first generated subframe (applied up to primary scrambling) is repeatedly transmitted (L−1) times. In this case, the randomly interleaving method may be designed to maximally suppress interleaving in the same order between inter-cells, based on a value of a cell ID etc. In terms of inter-cell interference randomization, it may be expected that this will not cause consecutive collision of the repeatedly transmitted same data between inter-cells. Particularly, in a slow-fading environment in which channel variation between repeatedly transmitted subframes is not large, reception complexity of the UE may be greatly reduced while performing inter-cell interference randomization by randomly interleaving a transmission order of (transmission) symbols using a cell ID based function within subframes transmitted L times. The UE may deinterleave and combine the transmission order of the (transmission) symbols without performing FFT for each of the (transmission) symbols repeatedly transmitted L times and then performs RE-level descrambling in the frequency domain by performing FFT once.

Table 14 illustrates a secondary interleaving process of a (transmission) symbol-level.

TABLE 14

1) Get a block of complex-valued symbols (=modulation symbols) $y_{0,f}^p(0)$, ..., $y_{0,f}^p(N-1)$
   M = number of OFDM symbols in a subframe
   N = number of complex-valued symbols in an OFDM symbol #1
   (e.g., N = 12)
2) The complex-valued symbols to be transmitted in a subframe #s (s = 1, ..., L−1) is obtained as follows
   $\tilde{y}_{s,f}^p(i) = y_{0,\theta((s-1) \cdot M + i)}^p(i)$
   Where $\theta(i)$, i = 0, ..., M(L − 1) − 1 is a scrambling/interleaving sequence initialized using a value associated with $N_{ID}^{N\,cell}$.

If a reference signal (e.g., an NRS) is included in a specific (transmission) symbol, since such (transmission) symbol-level interleaving may be restricted, other (transmission) symbol-level interleaving may be applied to some (transmission) symbols including the reference signal as follows. However, when the reference signal is transmitted in all (transmission) symbols or there is no data to be scrambled in the corresponding (transmission) symbols, the above-described method may be applied without change.

(1) Interleaving is performed only for a data RE at a (transmission) symbol-level between (transmission) symbols including the reference signal. In this case, although the UE may not perform deinterleaving and descrambling by performing FFT once, inter-cell interference randomization may be expected. Even in this case, the UE may perform combining for (transmission) symbols without the reference signal by deinterleaving a transmission order of the (transmission) symbols and then perform descrambling of an RE-level in the frequency domain by performing FFT once.

(2) Descrambling of the (transmission) symbol including the reference signal may apply only RE-level scrambling or may use the scrambling method of Method #4. In addition, similar to Method #4, depending on whether another UE that does not know whether the scrambling sequence is applied to the reference signal needs to receive the reference signal, Method #5 is applied or only RE-level scrambling may be applied to the (transmission) symbol including the reference signal.

FIG. 14 illustrates a process according to Method #5 and an operation order is as follows.

FIG. 15 illustrates an example of proposed scrambling Method #5.

FIG. 15 illustrates an example of proposed Method #5 and an operation order is as follows.

(1) One subframe consisting of N×M data (modulation) symbols may be generated.

(2) A scrambling sequence generator may be initialized and a scrambling sequence having a length of N×M may be generated. When scrambling is applied to an I/Q phase, a scrambling sequence having a length of N×M×2 may be generated.

(3) Each data (modulation) symbol and sequence of (1) and (2) may be scrambled in one-to-one correspondence and mapped to N×M REs (primary scrambling) (see Table 12).

(4) The scrambled first subframe may be copied into (L−1) subframes. Here, copying the subframe may be variously implemented as the meaning of repeatedly transmitting data of the first subframe in (L−1) subframes.

(5) A scrambling sequence having a length of M×(L−1) may be generated. Here, the scrambling sequence is used in the same concept as the sequence for interleaving and is used to interleave the order of M (transmission) symbols in a specific subframe. The sequence for interleaving the (transmission) symbol order may be different (per subframe) during L subframes and the (transmission) symbol order of the first subframe may be fixed to 0, 1, ..., M−1. In addition, a cell ID etc. may be used to generate the sequence for interleaving the (transmission) symbol order, so that the (transmission) symbols may be generated so as not to interleaved in the same order as much as possible between inter-cells. In addition, the scrambling sequence having a length of M×L or M×L×2 may be generated according to an implementation method. In this case, secondary scrambling may be applied even to the first subframe in which data is transmitted.

(6) The (transmission) symbol order is interleaved according to the sequence generated within each subframe (secondary scrambling) (see Table 14), (7) The generated L subframes may be sequentially transmitted. In this case, sequential transmission does not necessarily need to be consecutive in the time domain. Here, transmitting the subframe means transmitting data through the corresponding subframes.

The proposed "symbol-level scrambling and interleaving for inter-cell interference randomization" method may be applied to both OFDMA and SC-FDMA schemes and may also be applied to other multiplexing or multiple access schemes. In addition, the proposed method may be applied to a single-carrier system other than a multi-carrier system and may be applied regardless of DL, UL, and link direction. The proposed method is not always applied only to inter-cell interference randomization and may be used to randomize inter-used interference and inter-stream interference. In particular, the proposed method may be used when the same payload or information is repeatedly transmitted through a specific channel and signal.

The proposed symbol-level scrambling and interleaving method may be additionally applied separately from scrambling and interleaving applied to bit-level and modulation (scheme such as QAM, PSK, FSK, or offset QAM).

Figure 16:
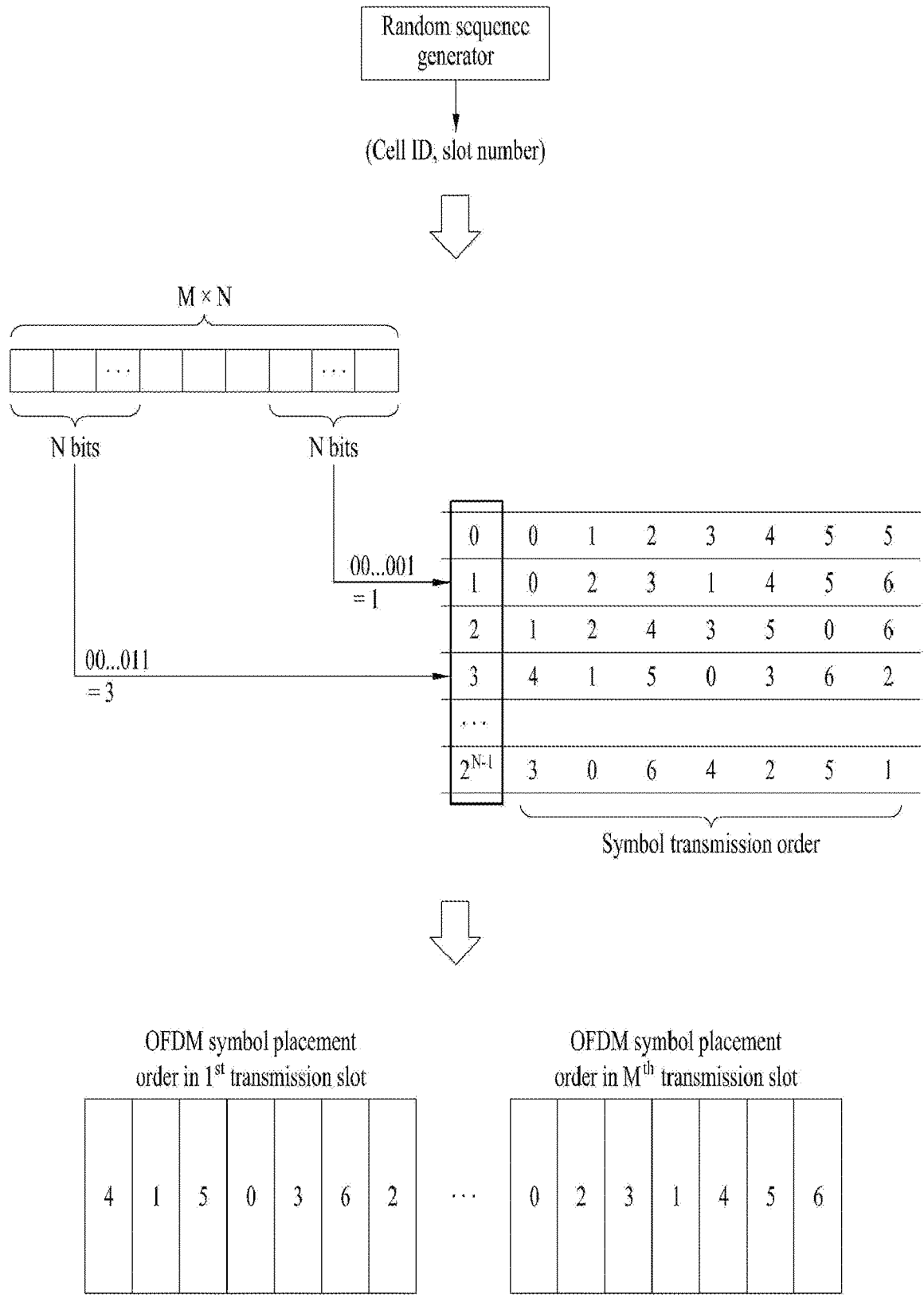

The proposed symbol-level scrambling and interleaving method serves to randomize inter-cell interference and elements used for randomization (e.g., variables/parameters used for a scrambling sequence/code of symbol-level scrambling or variables/parameters used for rearrangement of a transmission order of symbols in symbol-level interleaving) may include a cell ID, a UE ID, and a stream order. In addition, values indicating time and frequency resources (e.g., a radio frame number, a subframe number, a slot number, a frequency index, and an RB index) may be used as the elements for randomization. Random sequences (e.g., a Gold sequence and an m-sequence) may be generated based on the above-described randomization elements and symbol-level scrambling and interleaving may be performed based on the random sequences. For example, each element of the scrambling code used for symbol-level scrambling may be obtained from one, two, or more bits of a generated random sequence. Here, each element of the scrambling code is multiplied by data at a (transmission) symbol-level and the multiplication operation may be a method of modulating the phase of a signal by a specific phase in addition to simply changing only a sign. The scrambling code used for (transmission) symbol-level interleaving may group the generated random sequence into N bits, select a value between 0 and $2^N-1$, and select a specific column and row in a table that randomly deploys transmission order rearrangement, thereby performing symbol interleaving. This is simply illustrated as in FIG. 16. Referring to FIG. 16, it is assumed that each slot is repeatedly transmitted M times and each slot includes 7 symbols. In this case, a random sequence for symbol interleaving is generated using a cell ID and a slot number and grouped in units of N bits. Since the N bits corresponding to the first slot in the random sequence represent 3, transmission symbols are arranged in order of {4, 1, 5, 0, 3, 6, 2}. In addition, since the N bits corresponding to an M-th slot represent 1, the transmission symbols are arranged in order of {0, 2, 3, 1, 4, 5, 6}. Here, the numbers in parentheses indicate transmission symbol indexes in a slot when interleaving is not applied.

The proposed "symbol-level scrambling and interleaving for inter-cell interference randomization" method may be differently applied according to single-tone and multi-tone or may be differently applied according to a modulation scheme (e.g., BPSK, pi/2-BPSK, QPSK, or pi/4-QPSK).

For example, in the case of (transmission) symbol-level scrambling, for single-tone transmission (e.g., NPUSCH), a scrambling value for rotating an I/Q phase may be limited to pi and −pi so as not to increase a PAPR. That is, in order to maintain an existing BPSK (or pi/2-BPSK) PAPR, I/Q phase rotation may be restricted to be performed only pi or −pi using a 1-bit scrambling code (i.e., j and −j). On the other hand, for single-tone QPSK (or pi/4-QPSK) transmission, I/Q phase rotation may be defined to be performed by pi/2, pi, pi/3, or 0 using a 2-bit scrambling code (i.e., j, −1, −j, and 1). In a similar manner, in single-tone, the range and set of phase values capable of performing I/Q phase rotation may vary according to a modulation method.

In (transmission) symbol-level interleaving, if a specific relationship is needed between adjacent (transmission) symbols, such as pi/2-BPSK or pi/4-QPSK, (e.g., pi/2 differential, shift, or offset BPSK, or pi/4 differential, shift, offset QPSK), even (transmission) symbols and odd (transmission) symbols may be separately interleaved in order to maintain a corresponding characteristic. That is, interleaving may be limitedly performed only between even (transmission) symbols or between odd (transmission) symbols. In a similar way, if a specific relationship is needed between one or more adjacent (transmission) symbols, interleaving may not be performed between (transmission) symbols (e.g., N consecutive (transmission) symbols where N>1) that need to satisfy a corresponding characteristic and interleaving may be limitedly performed only between (transmission) symbols having an interval of the N consecutive symbols or more.

Figure 17:
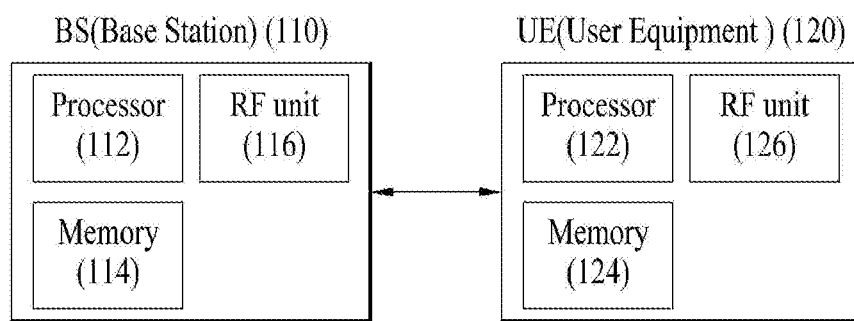
FIG. 17 illustrates a base station and a user equipment applicable to an embodiment of the present disclosure.

FIG. 17 illustrates a BS and a UE of a wireless communication system, which are applicable to embodiments of the present disclosure.

Referring to FIG. 17, the wireless communication system includes a BS 110 and a UE 120. When the wireless communication system includes a relay, the BS or UE may be replaced by the relay.

The BS 110 includes a processor 112, a memory 114 and a radio frequency (RF) unit 116. The processor 112 may be configured to implement the procedures and/or methods proposed by the present disclosure. The memory 114 is connected to the processor 112 and stores information related to operations of the processor 112. The RF unit 116 is connected to the processor 112 and transmits and/or receives an RF signal. The UE 120 includes a processor 122, a memory 124 and an RF unit 126. The processor 122 may be configured to implement the procedures and/or methods proposed by the present disclosure. The memory 124 is connected to the processor 122 and stores information related to operations of the processor 122. The RF unit 126 is connected to the processor 122 and transmits and/or receives an RF signal.

The embodiments of the present disclosure described hereinbelow are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It will be obvious to those skilled in the art that claims that are not explicitly cited in each other in the appended claims may be presented in combination as an embodiment of the present disclosure or included as a new claim by a subsequent amendment after the application is filed.

In the embodiments of the present disclosure, a description is made centering on a data transmission and reception relationship among a BS, a relay, and an MS. In some cases, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'BS' may be replaced with the term 'fixed station', 'Node B', 'enhanced Node B (eNode B or eNB)', 'access point', etc. The term 'UE' may be replaced with the term 'Mobile Station (MS)', 'Mobile Subscriber Station (MSS)', 'mobile terminal', etc.

The embodiments of the present disclosure may be achieved by various means, for example, hardware, firmware, software, or a combination thereof. In a hardware configuration, the methods according to the embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present disclosure may be implemented in the form of a module, a procedure, a function, etc. For example, software code may be stored in a memory unit and executed by a processor. The memory unit is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The present disclosure is applicable to UEs, eNBs or other apparatuses of a wireless mobile communication system.

The invention claimed is:

1. A method of transmitting a signal by a base station (BS) in a wireless communication system, the method comprising:
generating a first complex symbol sequence related to one time unit including a plurality of transmission symbols;
generating a second complex symbol sequence by applying primary scrambling to the first complex symbol sequence in units of modulation symbols; and
repeatedly transmitting the second complex symbol sequence through a plurality of time units, wherein secondary scrambling is applied to a signal in each time unit in units of transmission symbols by multiplying one value among a plurality of complex values, in units of the transmission symbols, to the signal in each time unit,
wherein the transmission symbols include orthogonal frequency division multiplexing (OFDM) symbols or single-carrier frequency division multiple access (SC-FDMA) symbols.

2. The method of claim 1, wherein the second complex symbol sequence is transmitted through a narrowband physical downlink control channel (NPDCCH), a narrowband physical downlink shared channel (NPDSCH), or a narrowband physical uplink shared channel (NPUSCH).

3. The method of claim 1, wherein the time unit includes a slot.

4. The method of claim 1, wherein the second complex symbol sequence is transmitted through 1, 3, 6, or 12 subcarriers in each time unit.

5. The method of claim 1, wherein the order of the transmission symbols of the signal changes for each time unit.

6. The method of claim 1, wherein the wireless communication system includes a wireless communication system supporting narrowband Internet of Things (NB-IoT).

7. A user equipment (UE) used in a wireless communication system, the UE comprising:
a transmitter and a receiver; and
at least one processor; and
at least one computer memory operably connected to the at least one processor and storing instructions that, based on being executed by the at least one processor, perform operations comprising:
generating a first complex symbol sequence related to one time unit including a plurality of transmission symbols,
generating a second complex symbol sequence by applying primary scrambling to the first complex symbol sequence in units of modulation symbols, and
repeatedly transmitting the second complex symbol sequence through a plurality of time units, wherein secondary scrambling is applied to a signal in each time unit in units of transmission symbols by multiplying one value among a plurality of complex values, in units of the transmission symbols, to the signal in each time unit, and
wherein the transmission symbols include orthogonal frequency division multiplexing (OFDM) symbols or single-carrier frequency division multiple access (SC-FDMA) symbols.

8. The UE of claim 7, wherein the second complex symbol sequence is transmitted through a narrowband physical downlink control channel (NPDCCH), a narrowband physical downlink shared channel (NPDSCH), or a narrowband physical uplink shared channel (NPUSCH).

9. The UE of claim 7, wherein the time unit includes a slot.

10. The UE of claim 7, wherein the second complex symbol sequence is transmitted through 1, 3, 6, or 12 subcarriers in each time unit.

11. The UE of claim 7, wherein the order of the transmission symbols of the signal changes for each time unit.

12. The UE of claim 7, wherein the wireless communication system includes a wireless communication system supporting narrowband Internet of Things (NB-IoT).

* * * * *